US009175590B2

(12) United States Patent
Umemoto et al.

(10) Patent No.: US 9,175,590 B2
(45) Date of Patent: Nov. 3, 2015

(54) EXHAUST PURIFICATION SYSTEM OF INTERNAL COMBUSTION ENGINE

(75) Inventors: Kazuhiro Umemoto, Ebina (JP); Kohei Yoshida, Gotenba (JP); Mikio Inoue, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/578,148

(22) PCT Filed: Nov. 30, 2011

(86) PCT No.: PCT/JP2011/077654

§ 371 (c)(1), (2), (4) Date: Aug. 9, 2012

(87) PCT Pub. No.: WO2013/080328

PCT Pub. Date: Jun. 6, 2013

(65) Prior Publication Data

US 2014/0286828 A1 Sep. 25, 2014

(51) Int. Cl.
*B01D 50/00* (2006.01)
*F01N 3/08* (2006.01)
(Continued)

(52) U.S. Cl.
CPC ............ *F01N 3/0842* (2013.01); *F01N 3/0814* (2013.01); *F01N 3/0871* (2013.01); (Continued)

(58) Field of Classification Search
CPC . B01D 53/8531; F01N 3/0842; F01N 3/0814; F01N 3/2033; F01N 3/2013; F01N 2510/06
USPC ............. 422/177, 171, 180; 60/285, 286, 301
See application file for complete search history.

(56) References Cited

U.S. PATENT DOCUMENTS 5,052,178 A 10/1991 Clerc et al.
5,057,483 A 10/1991 Wan
(Continued)

FOREIGN PATENT DOCUMENTS

CN 101454081 A 6/2009
CN 101600860 A 12/2009
(Continued)

OTHER PUBLICATIONS

Jun. 18, 2014 Office Action issued in U.S. Appl. No. 13/582,909.
(Continued)

*Primary Examiner* — Tom P Duong
(74) *Attorney, Agent, or Firm* — Oliff PLC

(57) ABSTRACT

An exhaust purification system of an internal combustion engine provided with an exhaust purification catalyst which reacts $NO_X$ and hydrocarbons. The exhaust purification catalyst includes an upstream side catalyst and a downstream side catalyst. The upstream side catalyst has an oxidation ability, while the downstream side catalyst carries precious metal catalyst particles on the exhaust flow surface and is formed with basic exhaust flow surface parts. The exhaust purification catalyst can make the concentration of hydrocarbons vibrate by within a predetermined range of amplitude and by within a predetermined range of period so as to partially oxidize the hydrocarbons or produce reducing intermediates at the upstream side catalyst. When the temperature of the upstream side catalyst is less than a first judgment temperature and the temperature of the downstream side catalyst is higher than a second judgment temperature, the temperature of the upstream side catalyst is made to rise.

4 Claims, 14 Drawing Sheets

(51) Int. Cl.

| | |
|---|---|
| ***F01N 3/10*** | (2006.01) |
| ***F02D 41/14*** | (2006.01) |
| ***F01N 13/00*** | (2010.01) |
| *F01N 3/36* | (2006.01) |
| *F01N 3/021* | (2006.01) |
| *F02D 41/02* | (2006.01) |
| *F01N 3/20* | (2006.01) |

(52) U.S. Cl.

CPC ............... *F01N 3/103* (2013.01); *F01N 3/106* (2013.01); *F01N 13/0097* (2014.06); *F02D 41/1441* (2013.01); *F02D 41/1446* (2013.01); *F01N 3/021* (2013.01); *F01N 3/2026* (2013.01); *F01N 3/2033* (2013.01); *F01N 3/36* (2013.01); *F01N 2430/06* (2013.01); *F01N 2510/0682* (2013.01); *F01N 2560/06* (2013.01); *F01N 2560/08* (2013.01); *F01N 2560/14* (2013.01); *F01N 2610/03* (2013.01); *F01N 2900/0412* (2013.01); *F01N 2900/1404* (2013.01); *F01N 2900/1602* (2013.01); *F02D 41/0245* (2013.01); *F02D 41/0275* (2013.01)

(56) References Cited

U.S. PATENT DOCUMENTS

| | | | |
|---|---|---|---|
| 5,075,274 | A | 12/1991 | Kiyohide et al. |
| 5,402,641 | A | 4/1995 | Katoh et al. |
| 5,882,607 | A | 3/1999 | Miyadera et al. |
| 6,109,024 | A | 8/2000 | Kinugasa et al. |
| 6,327,851 | B1 | 12/2001 | Bouchez et al. |
| 6,413,483 | B1 | 7/2002 | Brisley et al. |
| 6,477,834 | B1 | 11/2002 | Asanuma et al. |
| 6,667,018 | B2 | 12/2003 | Noda et al. |
| 6,813,882 | B2 | 11/2004 | Hepburn et al. |
| 6,854,264 | B2 | 2/2005 | Elwart et al. |
| 6,877,311 | B2 | 4/2005 | Uchida |
| 6,983,589 | B2 | 1/2006 | Lewis et al. |
| 7,063,642 | B1 | 6/2006 | Hu et al. |
| 7,073,325 | B2 | 7/2006 | Nakatani et al. |
| 7,082,753 | B2 | 8/2006 | Dalla Betta et al. |
| 7,111,456 | B2 | 9/2006 | Yoshida et al. |
| 7,137,379 | B2 | 11/2006 | Sasaki et al. |
| 7,146,800 | B2 | 12/2006 | Toshioka et al. |
| 7,165,393 | B2 | 1/2007 | Betta et al. |
| 7,299,625 | B2 | 11/2007 | Uchida et al. |
| 7,332,135 | B2 | 2/2008 | Gandhi et al. |
| 7,412,823 | B2 | 8/2008 | Reuter et al. |
| 7,454,900 | B2 | 11/2008 | Hayashi |
| 7,484,504 | B2 | 2/2009 | Kato et al. |
| 7,506,502 | B2 | 3/2009 | Nakano et al. |
| 7,549,284 | B2 | 6/2009 | Iihoshi et al. |
| 7,703,275 | B2 | 4/2010 | Asanuma et al. |
| 7,707,821 | B1 | 5/2010 | Legare |
| 7,861,516 | B2 | 1/2011 | Allansson et al. |
| 8,099,950 | B2 | 1/2012 | Kojima et al. |
| 8,215,101 | B2 | 7/2012 | Tsujimoto et al. |
| 8,261,532 | B2 | 9/2012 | Fukuda et al. |
| 8,281,569 | B2 | 10/2012 | Handa et al. |
| 8,434,296 | B2 | 5/2013 | Wada et al. |
| 8,572,950 | B2 | 11/2013 | Bisaiji et al. |
| 8,656,706 | B2 | 2/2014 | Umemoto et al. |
| 8,671,667 | B2 | 3/2014 | Bisaiji et al. |
| 8,679,410 | B2 | 3/2014 | Umemoto et al. |
| 8,689,543 | B2 | 4/2014 | Numata et al. |
| 8,695,325 | B2 | 4/2014 | Bisaiji et al. |
| 2001/0052232 | A1 | 12/2001 | Hoffmann et al. |
| 2002/0029564 | A1 | 3/2002 | Roth et al. |
| 2002/0053202 | A1 | 5/2002 | Akama et al. |
| 2003/0010020 | A1 | 1/2003 | Taga et al. |
| 2003/0040432 | A1 | 2/2003 | Beall et al. |
| 2003/0101713 | A1 | 6/2003 | Betta et al. |
| 2004/0045285 | A1 | 3/2004 | Penetrante et al. |
| 2004/0050037 | A1 | 3/2004 | Betta et al. |
| 2004/0055285 | A1 | 3/2004 | Rohr et al. |
| 2004/0154288 | A1 | 8/2004 | Okada et al. |
| 2004/0175305 | A1 | 9/2004 | Nakanishi et al. |
| 2004/0187477 | A1 | 9/2004 | Okugawa et al. |
| 2005/0135977 | A1 | 6/2005 | Park et al. |
| 2005/0147541 | A1 | 7/2005 | Ajisaka et al. |
| 2006/0053778 | A1 | 3/2006 | Asanuma et al. |
| 2006/0107657 | A1 | 5/2006 | Bernler et al. |
| 2006/0153761 | A1 | 7/2006 | Bandl-Konrad et al. |
| 2006/0286012 | A1 | 12/2006 | Socha et al. |
| 2007/0016357 | A1 | 1/2007 | Nakagawa et al. |
| 2007/0028601 | A1 | 2/2007 | Duvinage et al. |
| 2007/0059223 | A1 | 3/2007 | Golunski et al. |
| 2007/0089403 | A1 | 4/2007 | Pfeifer et al. |
| 2007/0125073 | A1 | 6/2007 | Reuter |
| 2007/0151232 | A1 | 7/2007 | Dalla Betta et al. |
| 2008/0022662 | A1 | 1/2008 | Yan |
| 2008/0053073 | A1 | 3/2008 | Kalyanaraman et al. |
| 2008/0102010 | A1 | 5/2008 | Bruck et al. |
| 2008/0120963 | A1 | 5/2008 | Morita et al. |
| 2008/0148711 | A1 | 6/2008 | Takubo |
| 2008/0154476 | A1 | 6/2008 | Takubo |
| 2008/0196398 | A1 | 8/2008 | Yan |
| 2008/0223020 | A1 | 9/2008 | Yoshida et al. |
| 2008/0276602 | A1 | 11/2008 | McCabe et al. |
| 2009/0000277 | A1 | 1/2009 | Yoshida et al. |
| 2009/0049824 | A1 | 2/2009 | Kojima et al. |
| 2009/0049825 | A1 | 2/2009 | Ohashi |
| 2009/0049826 | A1 | 2/2009 | Toshioka et al. |
| 2009/0077948 | A1 | 3/2009 | Mondori et al. |
| 2009/0084091 | A1 | 4/2009 | Tsujimoto et al. |
| 2009/0118121 | A1 | 5/2009 | Sarai |
| 2009/0120072 | A1 | 5/2009 | Dalla Betta et al. |
| 2009/0151332 | A1 | 6/2009 | Toshioka et al. |
| 2009/0191108 | A1 | 7/2009 | Blanchard et al. |
| 2009/0196811 | A1 | 8/2009 | Yamashita et al. |
| 2009/0229251 | A1 | 9/2009 | Kadowaki |
| 2009/0249768 | A1 | 10/2009 | Asanuma et al. |
| 2009/0266057 | A1 | 10/2009 | Tsujimoto et al. |
| 2009/0282809 | A1 | 11/2009 | Toshioka |
| 2009/0288393 | A1 | 11/2009 | Matsuno et al. |
| 2009/0313970 | A1 | 12/2009 | Iida |
| 2010/0005873 | A1 | 1/2010 | Katoh et al. |
| 2010/0055012 | A1 | 3/2010 | Grisstede et al. |
| 2010/0107613 | A1 | 5/2010 | Masuda et al. |
| 2010/0115923 | A1 | 5/2010 | Tsujimoto et al. |
| 2010/0126148 | A1 | 5/2010 | Morishima et al. |
| 2010/0132356 | A1 | 6/2010 | Lee |
| 2010/0154387 | A1 | 6/2010 | Shibata et al. |
| 2010/0233051 | A1 | 9/2010 | Grisstede et al. |
| 2010/0236224 | A1 | 9/2010 | Kumar et al. |
| 2010/0242459 | A1 | 9/2010 | Tsujimoto et al. |
| 2011/0041486 | A1 | 2/2011 | Kato et al. |
| 2011/0047984 | A1 | 3/2011 | Lee et al. |
| 2011/0047988 | A1 | 3/2011 | Lewis et al. |
| 2011/0113754 | A1 | 5/2011 | Kohara et al. |
| 2011/0120100 | A1 | 5/2011 | Yin et al. |
| 2011/0131952 | A1 | 6/2011 | Onodera et al. |
| 2011/0173950 | A1 | 7/2011 | Wan et al. |
| 2011/0209459 | A1 | 9/2011 | Hancu et al. |
| 2012/0122660 | A1 | 5/2012 | Andersen et al. |
| 2012/0124967 | A1 | 5/2012 | Yang et al. |
| 2012/0124971 | A1 | 5/2012 | Bisaiji et al. |
| 2012/0131908 | A1 | 5/2012 | Bisaiji et al. |
| 2013/0000284 | A1 | 1/2013 | Bisaiji et al. |
| 2013/0011302 | A1 | 1/2013 | Bisaiji et al. |
| 2013/0022512 | A1 | 1/2013 | Bisaiji et al. |

FOREIGN PATENT DOCUMENTS

| | | | |
|---|---|---|---|
| EP | 1 033 479 | A2 | 9/2000 |
| EP | 1 273 337 | A1 | 1/2003 |
| EP | 1 371 415 | A1 | 12/2003 |
| EP | 1 519 015 | A2 | 3/2005 |
| EP | 1544429 | A1 | 6/2005 |
| EP | 1 710 407 | A1 | 10/2006 |
| EP | 1 793 099 | A1 | 6/2007 |
| EP | 1 911 506 | A1 | 4/2008 |
| EP | 1 936 164 | A1 | 6/2008 |

(56) References Cited

FOREIGN PATENT DOCUMENTS

| | | | |
|---|---|---|---|
| EP | 1 965 048 | A1 | 9/2008 |
| EP | 2 063 078 | A1 | 5/2009 |
| EP | 2 149 684 | A1 | 2/2010 |
| EP | 2 239 432 | | 10/2010 |
| EP | 2 460 989 | A1 | 6/2012 |
| JP | A-04-200637 | | 7/1992 |
| JP | H-08-117601 | | 5/1996 |
| JP | A-09-004437 | | 1/1997 |
| JP | A-09-220440 | | 8/1997 |
| JP | A-11-30117 | | 2/1999 |
| JP | A-11-062559 | | 3/1999 |
| JP | A-11-081994 | | 3/1999 |
| JP | A-2000-257419 | | 9/2000 |
| JP | A-2002-188429 | | 7/2002 |
| JP | A-2004-016850 | | 1/2004 |
| JP | A-2004-36543 | | 2/2004 |
| JP | A-2004-216224 | | 8/2004 |
| JP | A-2004-290965 | | 10/2004 |
| JP | A-2004-308526 | | 11/2004 |
| JP | A-2004-316458 | | 11/2004 |
| JP | A-2005-61340 | | 3/2005 |
| JP | A-2005-113801 | | 4/2005 |
| JP | A-2005-171853 | | 6/2005 |
| JP | A-2005-177738 | | 7/2005 |
| JP | A-2006-501390 | | 1/2006 |
| JP | A-2006-512529 | | 4/2006 |
| JP | A-2006-342700 | | 12/2006 |
| JP | A-2007-064167 | | 3/2007 |
| JP | A-2007-514090 | | 5/2007 |
| JP | A-2007-514104 | | 5/2007 |
| JP | A-2007-154794 | | 6/2007 |
| JP | B2-3969450 | | 9/2007 |
| JP | A-2007-278120 | | 10/2007 |
| JP | A-2008-002451 | | 1/2008 |
| JP | A-2008-19760 | | 1/2008 |
| JP | A-2008-69769 | | 3/2008 |
| JP | A-2008-231926 | | 10/2008 |
| JP | A-2008-232003 | | 10/2008 |
| JP | A-2008-255858 | | 10/2008 |
| JP | A-2008-267178 | | 11/2008 |
| JP | A-2008-267217 | | 11/2008 |
| JP | A-2008-286186 | | 11/2008 |
| JP | A-2008-543559 | | 12/2008 |
| JP | A-2009-30560 | | 2/2009 |
| JP | A-2009-112967 | | 5/2009 |
| JP | A-2009-114879 | | 5/2009 |
| JP | A-2009-156067 | | 7/2009 |
| JP | A-2009-165922 | | 7/2009 |
| JP | A-2009-167973 | | 7/2009 |
| JP | A-2009-168031 | | 7/2009 |
| JP | A-2009-191823 | | 8/2009 |
| JP | A-2009-221939 | | 10/2009 |
| JP | A-2009-226349 | | 10/2009 |
| JP | A-2009-243362 | | 10/2009 |
| JP | A-2009-275631 | | 11/2009 |
| JP | A-2009-275666 | | 11/2009 |
| JP | A-2010-012459 | | 1/2010 |
| JP | A-2010-048134 | | 3/2010 |
| JP | A-2011-190803 | | 9/2011 |
| JP | B1-4868097 | | 2/2012 |
| WO | WO 2005/059324 | A1 | 6/2005 |
| WO | WO 2006/131825 | | 12/2006 |
| WO | WO 2007/026229 | | 3/2007 |
| WO | WO 2007/141638 | | 12/2007 |
| WO | WO 2008/007810 | | 1/2008 |
| WO | WO 2008/012653 | | 1/2008 |
| WO | WO 2009/016822 | | 2/2009 |
| WO | WO 2009/056958 | | 5/2009 |
| WO | WO 2009/082035 | | 7/2009 |
| WO | WO 2011/114499 | | 9/2011 |
| WO | WO 2011/114501 | | 9/2011 |
| WO | WO 2011/118044 | | 9/2011 |

OTHER PUBLICATIONS

Jun. 16, 2014 Office Action issued in U.S. Appl. No. 13/581,186.

Aug. 13, 2013 International Preliminary Report on Patentability issued in International Patent Application No. PCT/JP2011/053429 (with translation).

Aug. 8, 2013 Office Action issued in U.S. Appl. No. 13/258,483.

Feb. 6, 2014 Corrected Notice of Allowability issued in U.S. Appl. No. 13/202,694.

Dec. 21, 2010 International Search Report issued in International Patent Application No. PCT/JP2010/065449 (with translation).

Dec. 27, 2011 International Search Report issued in International Patent Application No. PCT/JP2011/075618 (with translation).

Jun. 15, 2010 International Search Report issued in International Patent Application No. PCT/JP2010/054730 (with translation).

Nov. 22, 2010 International Search Report issued in International Patent Application No. PCT/JP2010/065186 (with translation).

Jan. 18, 2011 International Search Report issued in International Patent Application No. PCT/JP2010/067705.

Jan. 18, 2011 International Search Report issued in International Application No. PCT/JP2010/067707.

Jan. 18, 2011 International Search Report issued in International Patent Application No. PCT/JP2010/068785.

Jul. 14, 2014 Office Action issued in U.S. Appl. No. 13/262,001.

Jul. 14, 2014 Office Action issued in U.S. Appl. No. 13/264,884.

Jun. 19, 2014 Office Action issued in U.S. Appl. No. 13/264,594.

Jun. 21, 2011 International Search Report issued in International Patent Application No. PCT/JP2011/059880 (with translation).

Jun. 23, 2014 Office Action issued in U.S. Appl. No. 13/262,858.

Jun. 26, 2014 Office Action issued in U.S. Appl. No. 13/580,000.

Jun. 29, 2010 International Search Report issued in International Patent Application No. PCT/JP2010/055303 (with translation).

Mar. 15, 2011 International Search Report issued in International Patent Application No. PCT/JP2011/053429 (with translation).

Mar. 22, 2011 International Search Report issued in International Patent Application No. PCT/JP2010/073645 (with translation).

Mar. 22, 2011 International Search Report issued in International Patent Application No. PCT/JP2010/072299 (with translation).

Mar. 8, 2011 International Search Report issued in International Patent Application No. PCT/JP2011/052969 (with translation).

May 15, 2013 Office Action in U.S. Appl. No. 13/202,694.

May 17, 2011 International Search Report issued in International Patent Application No. PCT/JP2011/057264 (with translation).

May 2, 2014 Office Action issued in U.S. Appl. No. 13/263,660.

Mar. 28, 2014 Notice of Allowance issued in U.S. Appl. No. 13/582,862.

Mar. 4, 2014 Notice of Allowance issued in U.S. Appl. No. 13/255,786.

Nov. 13, 2013 Notice of Allowance issued in U.S. Appl. No. 13/202,692.

Oct. 17, 2013 Notice of Allowance issued in U.S. Appl. No. 13/202,694.

Nov. 22, 2010 International Search Report issued in International Patent Application No. PCT/JP2010/065187.

Nov. 26, 2012 Office Action issued in U.S. Appl. No. 13/202,694.

Oct. 26, 2010 International Search Report issued in International Patent Application No. PCT/JP2010/063135.

Oct. 26, 2012 Office Action issued in U.S. Appl. No. 13/202,692.

Oct. 23, 2013 Office Action issued in U.S. Appl. No. 13/263,272.

Apr. 23, 2014 Office Action issued in U.S. Appl. No. 13/260,986.

Apr. 3, 2014 Office Action issued in U.S. Appl. No. 13/259,574.

Dec. 20, 2013 Office Action issued in U.S. Appl. No. 13/264,230.

Jul. 1, 2014 Office Action issued in U.S. Appl. No. 13/257,789.

Jul. 24, 2013 Office Action issued in U.S. Appl. No. 13/202,692.

May 7, 2014 Office Action issued in U.S. Appl. No. 13/264,062.

May 8, 2014 Office Action issued in U.S. Appl. No. 13/375,674.

U.S. Appl. No. 13/202,692 in the name of Umemoto et al., filed Sep. 20, 2011.

U.S. Appl. No. 13/202,733 in the name of Bisaui et al., filed Sep. 30, 2011.

U.S. Appl. No. 13/257,789 in the name of Nishioka et al., filed Oct. 14, 2011.

U.S. Appl. No. 13/258,483 in the name of Numata et al., filed Sep. 22, 2011.

U.S. Appl. No. 13/259,574 in the name of Tsukamoto et al., filed Sep. 23, 2011.

(56) References Cited

OTHER PUBLICATIONS

U.S. Appl. No. 13/259,885 in the name of Umemoto et al., filed Sep. 23, 2011.
U.S. Appl. No. 13/260,986 in the name of Watanabe et al., filed Sep. 29, 2011.
U.S. Appl. No. 13/262,858 in the name of Bisaiji et al., filed Oct. 4, 2011.
U.S. Appl. No. 13/263,272 in the name of Bisaiji et al., filed Oct. 6, 2011.
U.S. Appl. No. 13/263,660 in the name of Umemoto et al., filed Oct. 7, 2011.
U.S. Appl. No. 13/264,062 in the name of Watanabe et al., filed Oct. 12, 2011.
U.S. Appl. No. 13/264,230 in the name of Bisadi et al., filed Oct. 13, 2011.
U.S. Appl. No. 13/264,594 in the name of Inoue et al., filed Oct. 14, 2011.
U.S. Appl. No. 13/264,884 in the name of Bisaiji et al., flied Oct. 17, 2011.
U.S. Appl. No. 13/375,674 in the name of Inoue et al., filed Dec. 1, 2011.
U.S. Appl. No. 13/580,000 in the name of Bisaiji et al., filed Aug. 20, 2012.
U.S. Appl. No. 13/582,862 in the name of Uenishi et al., filed Sep. 5, 2012.
U.S. Appl. No. 13/202,694 in the name of Bisaui et al., filed Sep. 19, 2011.
U.S. Appl. No. 14/108,113 in the name of Bisaiji et al., filed Dec. 16, 2013.
U.S. Appl. No. 14/152,629 in the name of Umemoto et al., filed Jan. 10, 2014.
U.S. Appl. No. 13/262,001 in the name of Inoue et al., filed Oct. 19, 2011.
Nov. 22, 2010 Written Opinion issued in International Patent Application No. PCT/JP2010/065186 (with translation).
Dec. 27, 2011 Written Opinion issued in International Patent Application No. PCT/JP2011/075618.
Aug. 6, 2014 Notice of Allowance in U.S. Appl. No. 13/259,574.
Nov. 27, 2013 Notice of Allowance issued in U.S. Appl. No. 13/258,483.
Oct. 4, 2013 Notice of Allowance issued in U.S. Appl. No. 13/259,885.
U.S. Appl. No. 13/582,909, filed Sep. 5, 2012, in the name of Kazuhiro Umemoto et al.
U.S. Appl. No. 13/581,186, filed Aug. 24, 2012, in the name of Kazuhiro Umemoto et al.
Jun. 15, 2010 International Search Report issued in PCT/JP2010/054740 (with translation).
Jun. 15, 2010 Written Opinion issued in PCT/JP2010/054740 (with translation).
Jun. 20, 2012 Search Report issued in European Patent Application No. 10845966.0.
Jun. 15, 2010 International Search Report issued in International Application No. PCT/JP2010/054731 (with translation).
Jun. 29, 2010 International Search Report issued in International Patent Application No. PCT/JP2010/056345.
Apr. 4, 2013 Office Action issued in U.S. Appl. No. 13/255,710.
U.S. Appl. No. 13/255,774 in the name of Bisaiji et al., filed Sep. 22, 2011.
U.S. Appl. No. 13/255,710 in the name of Bisaiji et al., filed Oct. 12, 2011.
Oct. 24, 2013 Office Action issued in U.S. Appl. No. 13/255,710.
Jan. 17, 2013 Office Action issued in U.S. Appl. No. 13/202,733.
International Search Report dated Jun. 15, 2010 in International Application No. PCT/JP2010/054729.
International Search Report issued in International Application No. PCT/JP2011/066628 dated Sep. 13, 2011 (with Translation).
U.S. Appl. No. 13/502,210 in the name of Bisaiji et al., filed Apr. 16, 2012.
U.S. Appl. No. 13/499,211 in the name of Bisaiji et al., filed Mar. 29, 2012.
Jan. 22, 2014 Office Action issued in U.S. Appl. No. 13/499,211.
May 27, 2014 Office Action issued in U.S. Appl. No. 13/255,710.
Sep. 18, 2014 Notice of Allowance issued in U.S. Appl. No. 13/255,710.
U.S. Appl. No. 13/934,080 in the name of Bisaiji et al., filed Jul. 2, 2013.
Oct. 2, 2014 Office Action issued in U.S. Appl. No. 13/582,862.
Jul. 9, 2013 Notice of Allowance issued in U.S. Appl. No. 13/255,774.
Dec. 9, 2013 Notice of Allowance issued in U.S. Appl. No. 13/262,506.
Dec. 27, 2013 Notice of Allowance issued in U.S. Appl. No. 13/502,210.
U.S. Appl. No. 13/262,506 in the name of Bisaiji et al., filed Sep. 30, 2011.
U.S. Appl. No. 13/264,230 in the name of Bisaiji et al., filed Oct. 13, 2011.
U.S. Appl. No. 13/202,694 in the name of Bisaiji et al., filed Sep. 19, 2011.
U.S. Appl. No. 13/202,733 in the name of Bisaiji et al., filed Sep. 30, 2011.
Dec. 22, 2014 Office Action issued in U.S. Appl. No. 13/264,230.
Jun. 3, 2015 Office Action issued in U.S. Appl. No. 14/152,629.

EXHAUST PURIFICATION SYSTEM OF INTERNAL COMBUSTION ENGINE

TECHNICAL FIELD

The present invention relates to an exhaust purification system of an internal combustion engine.

BACKGROUND ART

The exhaust gas of diesel engines, gasoline engines, and other internal combustion engines includes, for example, carbon monoxide (CO), unburned fuel (HC), nitrogen oxides ($NO_X$), particulate matter (PM), and other constituents. The internal combustion engines are mounted with exhaust purification systems for removing these constituents.

Japanese Patent Publication (A) No. 2007-154794 discloses an exhaust purification system of an internal combustion engine which is provided with a plurality of branch passages, exhaust purification catalysts which are arranged in the branch passages, and fuel addition valves which are arranged at the upstream sides of the exhaust purification catalysts. This exhaust purification system is provided with heater-equipped catalysts at the upstream sides of the exhaust purification catalysts of part of the branch passages among the plurality of branch passages and reduces the flow rates of exhaust of the branch passages which are provided with the heater-equipped catalysts when warming up the exhaust purification catalysts. Further, this discloses to concentratedly run the exhaust through the other branch passages to warm the exhaust purification catalysts at the other branch passages. For the branch passages reduced in exhaust flow rates, the heater-equipped catalysts are electrified to warm up the exhaust purification catalysts. Further, this publication discloses to stop the electrification and inject fuel from fuel addition valves when the heater-equipped catalysts reach the activation temperature so as to raise the temperature of the exhaust by the oxidation reaction of the fuel occurring at the heater-equipped catalysts.

CITATIONS LIST

Patent Literature

PLT 1: Japanese Patent Publication (A) No. 2007-154794

SUMMARY OF INVENTION

Technical Problem

As a method for removing nitrogen oxides which are contained in the exhaust, arrangement of an $NO_X$ storage catalyst in an engine exhaust passage has been known. The $NO_X$ storage catalyst has the function of storing $NO_X$ which is contained in the exhaust when the air-fuel ratio of the inflowing exhaust gas is lean and releasing the stored $NO_X$ and reducing the $NO_X$ when the air-fuel ratio of the inflowing exhaust becomes rich.

The above publication discloses to arrange $NO_X$ storage catalysts as exhaust purification catalysts for raising the temperature. The exhaust purification system which is disclosed in the above publication is disclosed to raise the temperatures of the heater-equipped catalysts which are arranged at the upstream sides of the $NO_X$ storage catalysts so as to raise the temperature of the exhaust which flows into the $NO_X$ storage catalysts and activate the $NO_X$ storage catalysts in a short time. At the time of startup etc., it is therefore possible to raise the $NO_X$ storage catalysts to the activation temperature or more in a short time and remove the $NO_X$. In this regard, it is possible to raise the temperature of the $NO_X$ storage catalysts to the activation temperature or more so as to increase the $NO_X$ removal rate, but if the temperature becomes too high, the $NO_X$ removal rate sometimes falls.

The present invention has as its object the provision of an exhaust purification system of an internal combustion engine which is excellent in performance in removing nitrogen oxides.

Solution to Problem

An exhaust purification system of an internal combustion engine of the present invention is provided inside the engine exhaust passage with an exhaust purification catalyst which causes the $NO_X$ and hydrocarbons which are contained in the exhaust to react. The exhaust purification catalyst includes an upstream side catalyst and a downstream side catalyst. The upstream side catalyst has an oxidizing ability, while the downstream side catalyst carries precious metal catalyst particles on an exhaust flow surface and has basic exhaust flow surface parts formed around the catalyst particles. The exhaust purification catalyst has the property of reducing the $NO_X$ which is contained in the exhaust if making a concentration of hydrocarbons which flow into the exhaust purification catalyst "vibrate" by within a predetermined range of amplitude and by within a predetermined range of period by partially oxidizing the hydrocarbons, activating the $NO_X$ to generate active $NO_X$, making the partially oxidized hydrocarbons and the active $NO_X$ react so as to produce reducing intermediates, and making the reducing intermediates and the active $NO_X$ react. Further, the exhaust purification catalyst has the property of the amount of storage of $NO_X$ which is contained in the exhaust increasing if making a vibration period of the hydrocarbon concentration longer than a predetermined range. The system is formed so that, at the time of engine operation, it performs control to make the concentration of hydrocarbons which flow into the exhaust purification catalyst vibrate by within a predetermined range of amplitude and by within a predetermined range of period and reduce the $NO_X$ which is contained in the exhaust at the exhaust purification catalyst. The exhaust purification system is further provided with a temperature raising device which raises the temperature of the upstream side catalyst. A first judgment temperature is set based on the temperature at which the upstream side catalyst can partially oxidize the hydrocarbons by a predetermined efficiency or the temperature at which it can produce reducing intermediates by a predetermined efficiency. A second judgment temperature is set based on the temperature at which the downstream side catalyst can react the reducing intermediates and active $NO_X$ by a predetermined efficiency. In the exhaust purification catalyst, the temperature raising device raises the temperature of the upstream side catalyst when the temperature of the upstream side catalyst is less than the first judgment temperature and the temperature of the downstream side catalyst is higher than the second judgment temperature.

In the above-mentioned invention, the upstream side catalyst is comprised of an oxidation catalyst which has an oxidizing ability. The first judgment temperature can be set based on the temperature at which the upstream side catalyst can partially oxidize the hydrocarbons by a predetermined efficiency.

In the above-mentioned invention, the upstream side catalyst may has precious metal catalyst particles which are carried on an exhaust flow surface and basic exhaust flow surface parts which are formed around the catalyst particles. The first judgment temperature can be set based on the temperature at which the upstream side catalyst can produce reducing intermediates by a predetermined efficiency.

In the above-mentioned invention, the exhaust purification catalysts can be made a catalyst comprised of an upstream side catalyst and a downstream side catalyst formed integrally. The integral catalyst has precious metal catalyst particles which are carried on the exhaust flow surface and basic exhaust flow surface parts which are formed around the catalyst particles. It is possible to detect the temperature of the upstream side end of the integrally formed catalyst as the temperature of the upstream side catalyst and to detect the temperature of the downstream side end of the integrally formed catalyst as the temperature of the downstream side catalyst.

Advantageous Effects of Invention

According to the present invention, it is possible to provide an exhaust purification system of an internal combustion engine which is excellent in performance in removing nitrogen oxides.

DESCRIPTION OF EMBODIMENTS

Referring to FIG. 1 to FIG. 23, an exhaust purification system of an internal combustion engine in an embodiment will be explained. In the present embodiment, a compression ignition type of internal combustion engine which is mounted in a vehicle will be taken up as an example for the explanation.

Figure 1:
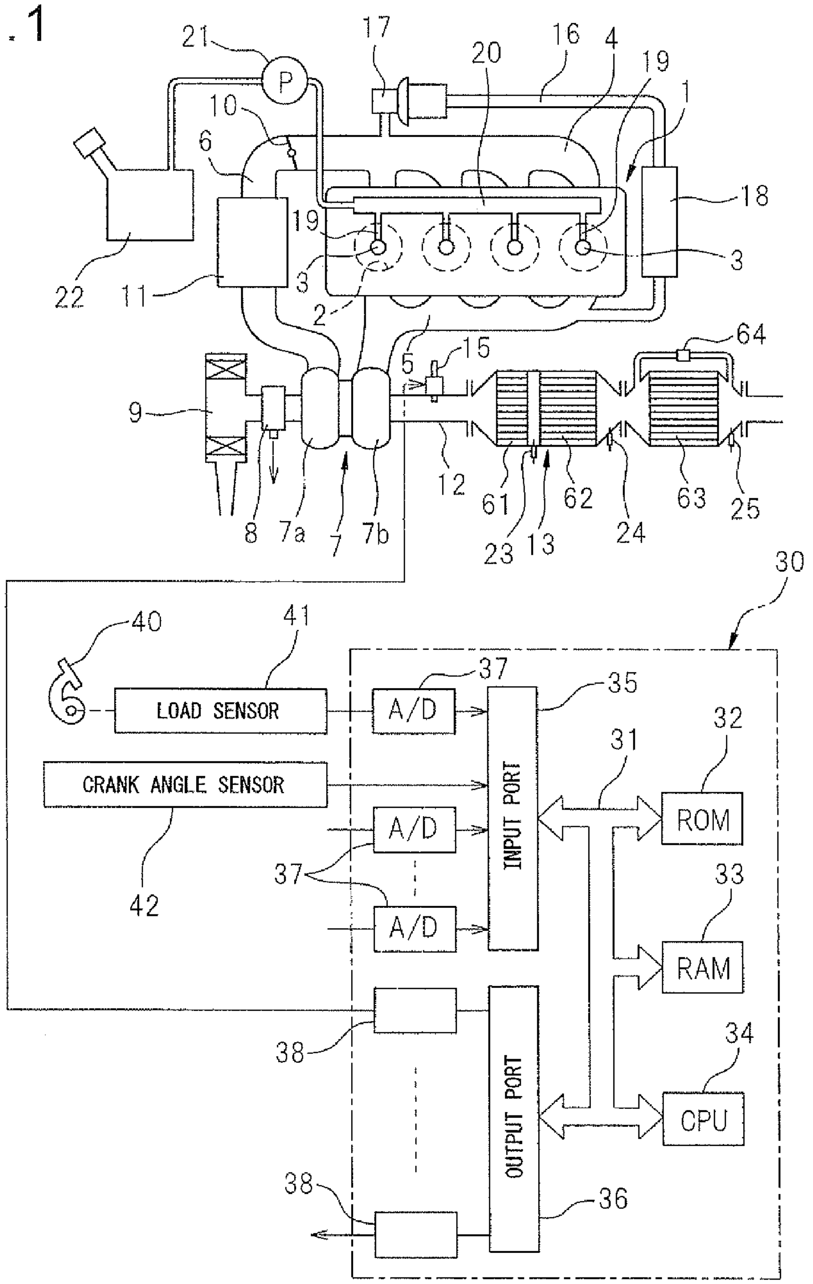
FIG. 1 is an overall view of a compression ignition type of an internal combustion engine which is provided with a first exhaust purification catalyst in an embodiment.

FIG. 1 is an overall view of an internal combustion engine in the present embodiment. The internal combustion engine is provided with an engine body 1. Further, the internal combustion engine is provided with an exhaust purification system which purifies the exhaust. The engine body 1 includes combustion chambers 2 as cylinders, electronically controlled fuel injectors 3 for injecting fuel to the combustion chambers 2, an intake manifold 4, and an exhaust manifold 5.

The intake manifold 4 is connected through an intake duct 6 to an outlet of a compressor 7*a* of an exhaust turbocharger 7. An inlet of the compressor 7*a* is connected through an intake air detector 8 to an air cleaner 9. Inside the intake duct 6, a throttle valve 10 is arranged which is driven by a step motor. Furthermore, in the middle of the intake duct 6, a cooling device 11 is arranged for cooling the intake air which flows through the inside of the intake duct 6. In the embodiment which is shown in FIG. 1, engine cooling water is guided to the cooling device 11. The engine cooling water is used to cool the intake air.

On the other hand, the exhaust manifold 5 is connected to the inlet of the exhaust turbine 7*b* of the exhaust turbocharger 7. The exhaust purification system in the present embodiment is provided with an exhaust purification catalyst 13 which removes the $NO_X$ which is contained in the exhaust. The exhaust purification catalyst 13 causes the $NO_X$ and the hydrocarbons which are contained in the exhaust to react. The first exhaust purification catalyst 13 in the present embodiment includes an upstream side catalyst 61 and a downstream side catalyst 62. The upstream side catalyst 61 and the downstream side catalyst 62 are connected in series. The exhaust purification catalyst 13 is connected through an exhaust pipe 12 to an outlet of the exhaust turbine 7*b*.

Upstream of the exhaust purification catalyst 13, a hydrocarbon feed valve 15 is arranged for feeding hydrocarbons comprised of diesel oil which is used as the fuel of a compression ignition type internal combustion engine or other fuel. In the present embodiment, diesel oil is used as the hydrocarbons which are fed from the hydrocarbon feed valve 15. Note that, the present invention can also be applied to a spark ignition type of internal combustion engine in which the air-fuel ratio at the time of combustion is controlled to be lean. In this case, from the hydrocarbon feed valve, hydrocarbons comprised of gasoline which is used as the fuel of the spark ignition type of internal combustion engine or other fuel are fed.

Downstream of the exhaust purification catalyst 13, a particulate filter 63 is arranged. The particulate filter 63 is a filter which removes carbon particles and other particulate which is contained in the exhaust. The particulate filter 63, for example, has a honeycomb structure and has a plurality of channels which extend in the direction of flow of the gas. In the plurality of channels, channels with downstream ends sealed and channels with upstream ends sealed are alternately formed. The partition walls of the channels are formed by a porous material such as cordierite. If the exhaust is passed through the partition walls, the particulate is trapped. The particulate which gradually builds up on the particulate filter 63 is removed by oxidation by regeneration control which raises the temperature inside an air-rich atmosphere to for example 650° C. or so.

Between the exhaust manifold 5 and the intake manifold 4, an EGR passage 16 is arranged for exhaust gas recirculation (EGR). In the EGR passage 16, an electronic control type of EGR control valve 17 is arranged. Further, in the middle of the EGR passage 16, a cooling device 18 is arranged for cooling the EGR gas which flows through the inside of the EGR passage 16. In the embodiment which is shown in FIG. 1, engine cooling water is guided to the inside of the cooling device 18. The engine cooling water is used to cool the EGR gas.

The respective fuel injectors 3 are connected through fuel feed tubes 19 to a common rail 20. The common rail 20 is connected through an electronic control type of variable discharge fuel pump 21 to a fuel tank 22. The fuel which is stored in the fuel tank 22 is fed by the fuel pump 21 to the inside of the common rail 20. The fuel which is fed to the common rail 20 is fed through the respective fuel feed tubes 19 to the fuel injectors 3.

An electronic control unit 30 in the present embodiment is comprised of a digital computer. The electronic control unit 30 in the present embodiment functions as a control device of the exhaust purification system. The electronic control unit 30 includes components which are connected to each other by a bidirectional bus 31 such as a ROM (read only memory) 32, RAM (random access memory) 33, CPU (microprocessor) 34, input port 35, and output port 36. The ROM 32 is a read only memory device. The ROM 32 stores in advance maps and other information which are required for control. The CPU 34 can perform any computations or judgment. The RAM 33 is a random access memory device. The RAM 33 can store operational history or other information or store results of computations.

Downstream of the upstream side catalyst 61, a temperature sensor 23 is attached for detecting the temperature of the upstream side catalyst 61. Downstream of the downstream side catalyst 62, a temperature sensor 24 is arranged for detecting the temperature of the downstream side catalyst 62. The particulate filter 63 has a differential pressure sensor 64 attached to it for detecting the pressure difference between the upstream side pressure and the downstream side pressure. Downstream of the particulate filter 63, a temperature sensor 25 is arranged which detects the temperature of the particulate filter 63. The output signals of the temperature sensors 23, 24, and 25, a differential pressure sensor 64, and intake air detector 8 are input through respectively corresponding AD converters 37 to the input port 35.

Further, an accelerator pedal 40 has a load sensor 41 connected to it which generates an output voltage which is proportional to the amount of depression of the accelerator pedal 40. The output voltage of the load sensor 41 is input through a corresponding AD converter 37 to the input port 35. Furthermore, the input port 35 has connected to it a crank angle sensor 42 which generates an output pulse every time the crankshaft rotates by for example 15°. The output of the crank angle sensor 42 can be used to detect the crank angle or the engine speed. On the other hand, the output port 36 is connected through corresponding drive circuits 38 to the fuel injectors 3, step motor for driving the throttle valve 10, hydrocarbon feed valve 15, EGR control valve 17, and fuel pump 21. These fuel injectors 3, throttle valve 10, hydrocarbon feed valve 15, EGR control valve 17, etc. are controlled by the electronic control unit 30.

Figure 2A:
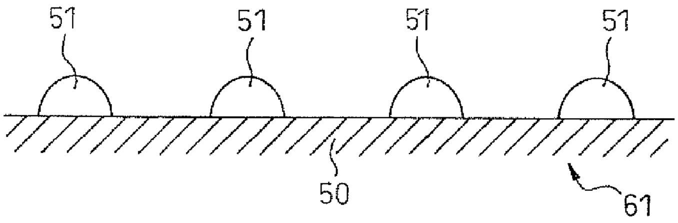
FIG. 2A is an enlarged schematic view of a surface part of a catalyst carrier in an upstream side catalyst in the first exhaust purification catalyst.

FIG. 2A schematically shows a surface part of the catalyst carrier which is carried on the substrate of the upstream side catalyst of the first exhaust purification catalyst. The upstream side catalyst 61 is comprised of a catalyst which has an oxidation ability. The upstream side catalyst 61 of the first exhaust purification catalyst in the present embodiment is a so-called oxidation catalyst. At the upstream side catalyst 61, catalyst particles 51 are carried on the catalyst carrier 50 formed from alumina etc. The catalyst particles 51 can be formed from a precious metal or transition metal or other material which has a catalytic action which promotes oxidation. The catalyst particles 51 in the present embodiment are formed by platinum Pt. The upstream side catalyst 61 of the first exhaust purification catalyst in the present embodiment does not have the later explained basic layer.

Figure 2B:
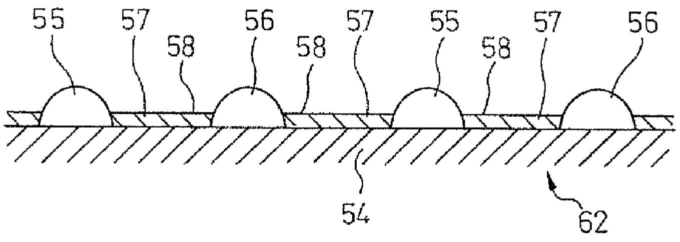
FIG. 2B is an enlarged schematic view of a surface part of a catalyst carrier in a downstream side catalyst in the first exhaust purification catalyst.

FIG. 2B schematically shows a surface part of the catalyst carrier which is carried on the substrate of the downstream side catalyst of the first exhaust purification catalyst. In the downstream side catalyst 62, precious metal catalyst particles 55, 56 are carried on a catalyst carrier 54 comprised of for example alumina. Furthermore, on the catalyst carrier 54, a basic layer 57 is formed which includes at least one element selected from potassium K, sodium Na, cesium Cs, or other such alkali metal, barium Ba, calcium Ca, or other such alkali earth metal, a lanthanide and other rare earths and silver Ag, copper Cu, iron Fe, iridium Ir, and other such metals able to donate electrons to $NO_X$. The exhaust flows along the catalyst carrier 54, so the catalyst particles 55, 56 can be said to be carried on the exhaust flow surface of the downstream side catalyst 62. Further, the surface of the basic layer 57 exhibits basicity, so the surface of the basic layer 57 is called a "basic exhaust flow surface part 58".

In FIG. 2B, the precious metal catalyst particles 55 are comprised of platinum Pt, while the precious metal catalyst particles 56 are comprised of rhodium Rh. That is, the catalyst particles 55, 56 which are carried on the catalyst carrier 54 are comprised of platinum Pt and rhodium Rh. Note that, the catalyst carrier 54 of the downstream side catalyst 62 can further carry palladium Pd in addition to platinum Pt and rhodium Rh or can carry palladium Pd instead of rhodium Rh. That is, the catalyst particles 55, 56 which are carried on the catalyst carrier 54 are comprised of platinum Pt and at least one of rhodium Rh and palladium Pd.

Figure 3:
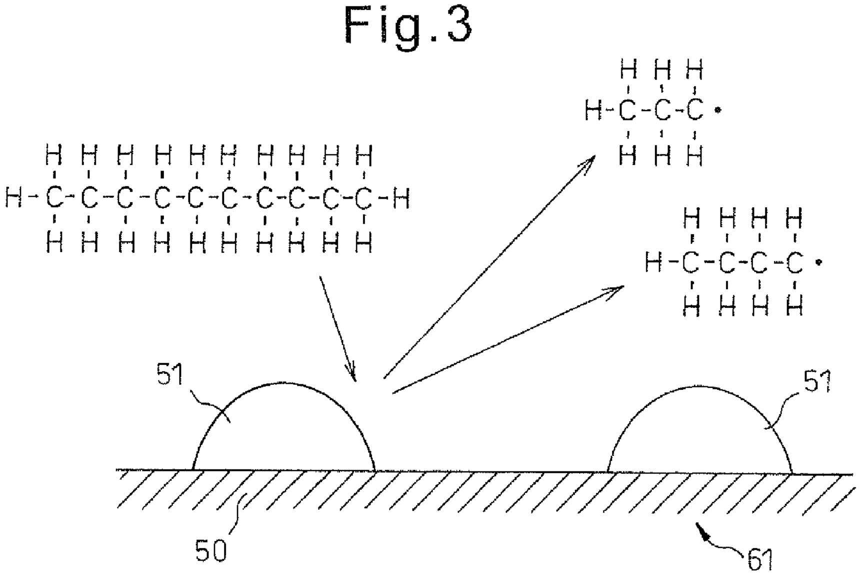
FIG. 3 is a view which explains an oxidation reaction of hydrocarbons in an upstream side catalyst in the first exhaust purification catalyst.

FIG. 3 schematically shows a surface part of the catalyst carrier which is carried on the substrate of the upstream side catalyst of the first exhaust purification catalyst. If hydrocarbons are injected from the hydrocarbon feed valve 15 into the exhaust, the hydrocarbons are reformed at the upstream side catalyst 61. That is, the hydrocarbons HC which are injected from the hydrocarbon feed valve 15 become radical hydrocarbons HC with few carbon atoms due to the catalytic action of the upstream side catalyst 61. In the first exhaust purification catalyst, the hydrocarbons which were reformed at the upstream side catalyst 61 are used to remove the $NO_X$ at the downstream side catalyst 62.

Further, even if injecting the fuel, that is, the hydrocarbons, from the fuel injectors 3 to the inside of the combustion chambers 2 in the second half of the expansion stroke or during the exhaust stroke, the hydrocarbons are reformed inside the combustion chambers 2 or at the upstream side catalyst 61, and the $NO_X$ which is contained in the exhaust is removed by the reformed hydrocarbons. Therefore, in the present invention, instead of feeding hydrocarbons from the hydrocarbon feed valve 15 to the inside of the engine exhaust passage, it is also possible to feed hydrocarbons to the insides of the combustion chambers 2 in the second half of the expansion stroke or during the exhaust stroke. In this way, in the present invention, it is possible to feed hydrocarbons into the combustion chambers 2, but below the case of injecting hydrocarbons from the hydrocarbon feed valve 15 to the inside of the engine exhaust passage will be used as an example for explaining the present invention.

Figure 4:
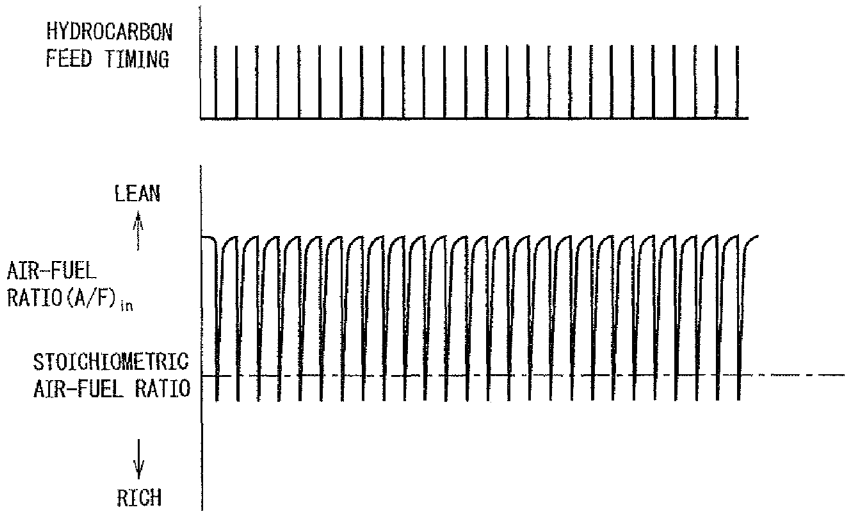
FIG. 4 is a view which shows changes in an air-fuel ratio of exhaust which flows into an exhaust purification catalyst in a first $NO_X$ removal method.

FIG. 4 shows the timing of feed of hydrocarbons from the hydrocarbon feed valve and the change in the air-fuel ratio (A/F)in of the exhaust which flows into the exhaust purification catalyst. Note that, the change of the air-fuel ratio (A/F)in depends on the change in the concentration of hydrocarbons in the exhaust which flows into the exhaust purification catalyst 13, so the change in the air-fuel ratio (A/F)in which is shown in FIG. 4 can be said to express the change in the concentration of hydrocarbons. However, if the concentration of hydrocarbons becomes higher, the air-fuel ratio (A/F)in becomes smaller. In FIG. 4, the richer the air-fuel ratio (A/F) in, the higher the concentration of hydrocarbons.

Figure 5:
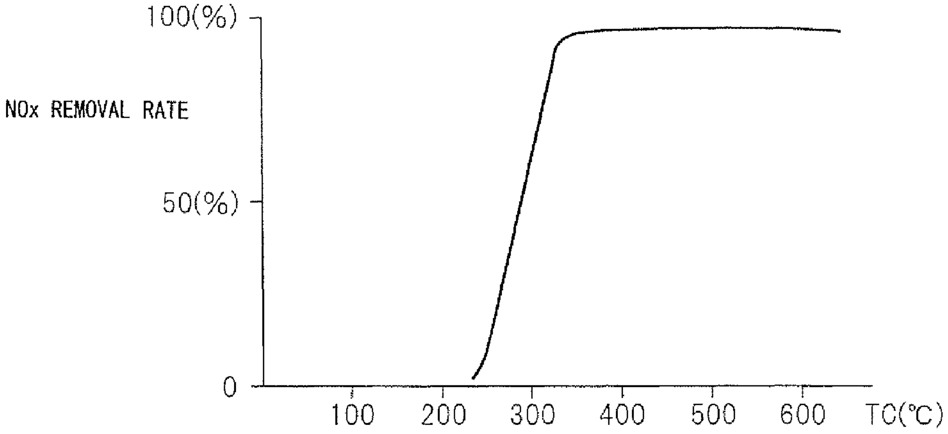
FIG. 5 is a view which shows an $NO_X$ removal rate of the first $NO_X$ removal method.

FIG. 5 shows the $NO_X$ removal rate by the exhaust purification catalyst 13 with respect to each catalyst temperature TC of the exhaust purification catalyst 13 when periodically changing the concentration of hydrocarbons which flow into the exhaust purification catalyst 13 so as to change the air-fuel ratio (A/F)in of the exhaust which flows into the exhaust purification catalyst 13 as shown in FIG. 4. The inventors engaged in extensive research on $NO_X$ removal over a long period of time and in the process of the research learned that if making the concentration of hydrocarbons which flow into the exhaust purification catalyst 13 "vibrate" by within a predetermined range of amplitude and by within a predetermined range of period, as shown in FIG. 5, an extremely high $NO_X$ removal rate is obtained even in the 400° C. or higher high temperature region.

Furthermore, at this time, they learned that a large amount of reducing intermediates containing nitrogen and hydrocarbons is produced in the exhaust purification catalyst 13 and these reducing intermediates play a central role in obtaining a high $NO_X$ removal rate.

Figure 6A:
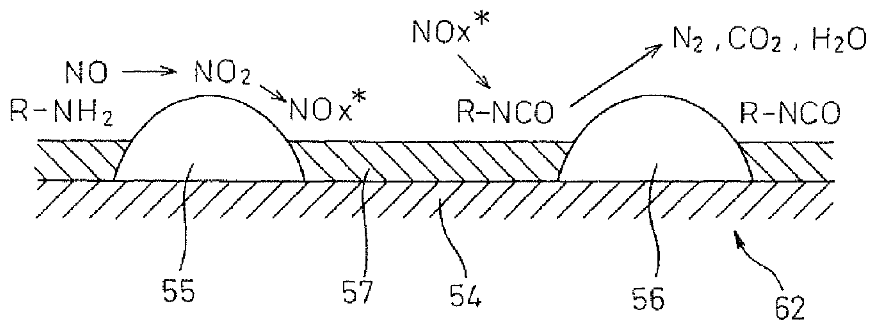
FIG. 6A is an enlarged schematic view which explains production of active $NO_X$ and reaction of reducing intermediates at a downstream side catalyst of the first $NO_X$ removal method.
Figure 6B:
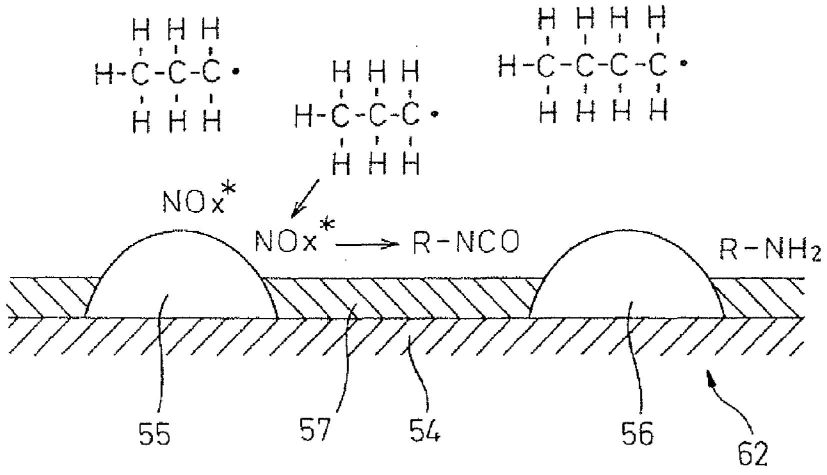
FIG. 6B is an enlarged schematic view which explains production of reducing intermediates in a downstream side catalyst of the first $NO_X$ removal method.

Next, this will be explained with reference to FIG. 6A and FIG. 6B. Note that, FIG. 6A and FIG. 6B schematically show surface parts of the catalyst carrier of the downstream side catalyst. FIG. 6A and FIG. 6B show the reaction which is presumed to occur when making the concentration of hydrocarbons which flow into the exhaust purification catalyst 13 vibrate by within a predetermined range of amplitude and by within a predetermined range of period.

FIG. 6A shows when the concentration of hydrocarbons which flows into the exhaust purification catalyst is low. As will be understood from FIG. 4, the air-fuel ratio of the exhaust which flows into the exhaust purification catalyst 13 is maintained lean except for an instant, so the exhaust which flows into the downstream side catalyst 62 usually becomes an excess of oxygen. Therefore, the NO which is contained in the exhaust is oxidized on the catalyst particles 55 and becomes $NO_2$, then this $NO_2$ is further oxidized and becomes $NO_3$. Further, part of the $NO_2$ becomes $NO_2^-$. In this case, the amount of production of $NO_3$ is far greater than the amount of production of $NO_2^-$. Therefore, on the catalyst particles 55, a large amount of $NO_3$ and a small amount of $NO_2^-$ are produced. These $NO_3$ and $NO_2^-$ are strong in activity. Below, these $NO_3$ and $NO_2^-$ will be called "active $NO_X$". These active $NO_X$ are held by deposition or adsorption on the surface of the basic layer 57.

Next, when hydrocarbons are fed from the hydrocarbon feed valve 15, as shown in FIG. 3, at the upstream side catalyst 61, the hydrocarbons which are contained in the exhaust are partially oxidized. The hydrocarbons are reformed inside the upstream side catalyst 61 to become radical in state. The reformed hydrocarbons are fed to the downstream side catalyst 62.

FIG. 6B shows when hydrocarbons are fed from the hydrocarbon feed valve and the concentration of hydrocarbons which flow into the exhaust purification catalyst becomes higher. If the concentration of hydrocarbons which flow into the downstream side catalyst 62 becomes higher, the concentration of hydrocarbons around the active $NO_X$ becomes higher. If the concentration of hydrocarbons around the active $NO_X$ becomes higher, the active $NO_X$ reacts with the radical hydrocarbons HC on the catalyst particles 55 whereby reducing intermediates are produced.

Note that, the reducing intermediate which is first produced at this time is believed to be the nitro compound R—$NO_2$. This nitro compound R—$NO_2$ becomes the nitrile compound R—CN when produced, but this nitrile compound R—CN can only survive in that state for an instant, so immediately becomes the isocyanate compound R—NCO. This isocyanate compound R—NCO becomes the amine compound R—$NH_2$ if hydrolyzed. However, in this case, what is hydrolyzed is believed to be part of the isocyanate compound R—NCO. Therefore, as shown in FIG. 6B, the majority of the reducing intermediates which are produced is believed to be the isocyanate compound R—NCO and amine compound R—$NH_2$. The large amount of reducing intermediates which are produced inside of the downstream side catalyst 62 are deposited or adsorbed on the surface of the basic layer 57.

Next, as shown in FIG. 6A, if the concentration of hydrocarbons which flow into the exhaust purification catalyst 13 becomes lower, at the downstream side catalyst 62, the active $NO_X$ and the produced reducing intermediates react. In this regard, after the active $NO_X$ is held on the surface of the basic layer 57 in this way or after the active $NO_X$ is produced, if the state of a high concentration of oxygen around the active $NO_X$ continues for a certain time period or more, the active $NO_X$ is oxidized and is absorbed inside the basic layer 57 in the form of nitric acid ions $NO_3^-$. However, if the reducing intermediates are produced before this certain time period elapses, as shown in FIG. 6A, the active $NO_X$ reacts with the reducing intermediates R—NCO or R—$NH_2$ to become $N_2$, $CO_2$, or $H_2O$ and therefore the $NO_X$ is removed. Note that, in this case, it is necessary to hold a sufficient amount of reducing intermediates R—NCO or R—$NH_2$ on the surface of the basic layer 57, that is, on the basic exhaust flow surface part 58, until the produced reducing intermediates react with the active $NO_X$. The basic exhaust flow surface parts 58 are provided for this reason.

In this way, the concentration of hydrocarbons which flow into the exhaust purification catalyst 13 is temporarily made high to produce reducing intermediates and the produced reducing intermediates are made to react with the active $NO_X$ to remove the $NO_X$. That is, to use the exhaust purification catalyst 13 to remove the $NO_X$, it is necessary to periodically change the concentration of hydrocarbons which flow into the exhaust purification catalyst 13.

Of course, in this case, it is necessary to raise the concentration of hydrocarbons to a concentration sufficiently high for producing the reducing intermediates. That is, it is necessary to make the concentration of hydrocarbons which flow into the exhaust purification catalyst 13 vibrate by within a predetermined range of amplitude.

On the other hand, if lengthening the feed period of hydrocarbons, the time period during which the concentration of oxygen becomes higher in the interval after hydrocarbons are fed to when hydrocarbons are next fed becomes longer and therefore the active $NO_X$ is absorbed inside the basic layer 57 in the form of nitrates without producing reducing intermediates. To avoid this, it is necessary to make the concentration of hydrocarbons which flow into the exhaust purification catalyst 13 vibrate by within a predetermined range of period. Incidentally, in the example which is shown in FIG. 4, the injection interval is made 3 seconds.

Figure 7A:
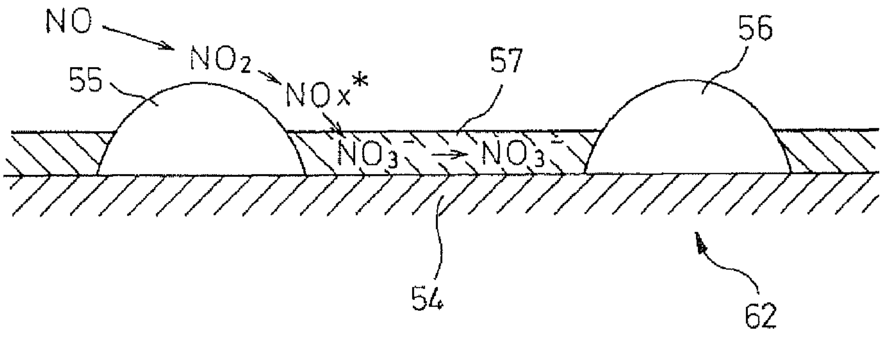
FIG. 7A is an enlarged schematic view which explains storage of $NO_X$ in a downstream side catalyst of a second $NO_X$ removal method.

As explained above, if making the vibration period of the concentration of hydrocarbons, that is, the period of feed of hydrocarbons HC, longer than a predetermined range of period, at the downstream side catalyst 62, the active $NO_X$ diffuses in the basic layer 57 in the form of nitric acid ions $NO_3^-$ as shown in FIG. 7A and becomes nitrates. That is, at this time, the $NO_X$ in the exhaust is absorbed inside the basic layer 57 in the form of nitrates.

Figure 7B:
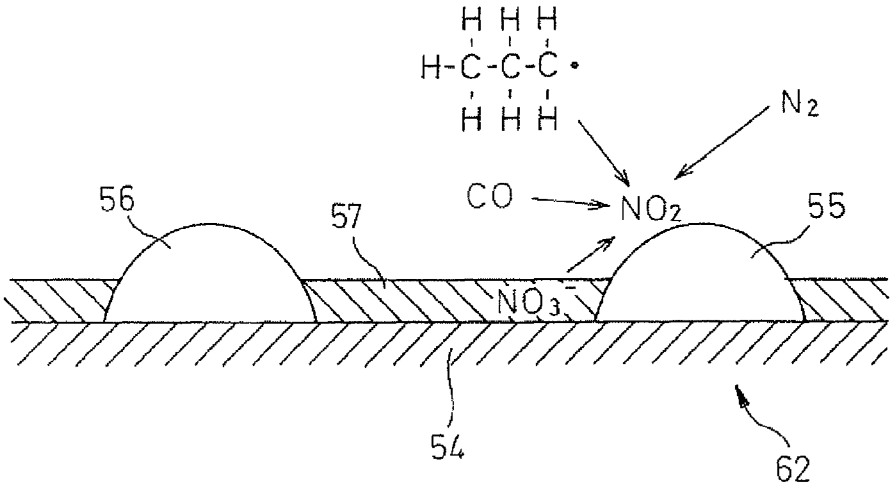
FIG. 7B is an enlarged schematic view which explains release and reduction of $NO_X$ in a downstream side catalyst of the second $NO_X$ removal method.

On the other hand, FIG. 7B shows the case where when, in this way, $NO_X$ is absorbed in the basic layer 57 in the form of nitrates, the air-fuel ratio of the exhaust which flows into the exhaust purification catalyst 13 is made the stoichiometric air-fuel ratio or rich. In this case, the concentration of oxygen in the exhaust falls, so the reaction proceeds in the opposite direction ($NO_3^- \rightarrow NO_2$) and therefore the nitrates which are absorbed inside the basic layer 57 successively become nitric acid ions $NO_3^-$ and, as shown in FIG. 7B, are released in the form of $NO_2$ from the basic layer 57. Next, the released $NO_2$ is reduced by the hydrocarbons HC and CO which are contained in the exhaust.

Figure 8:
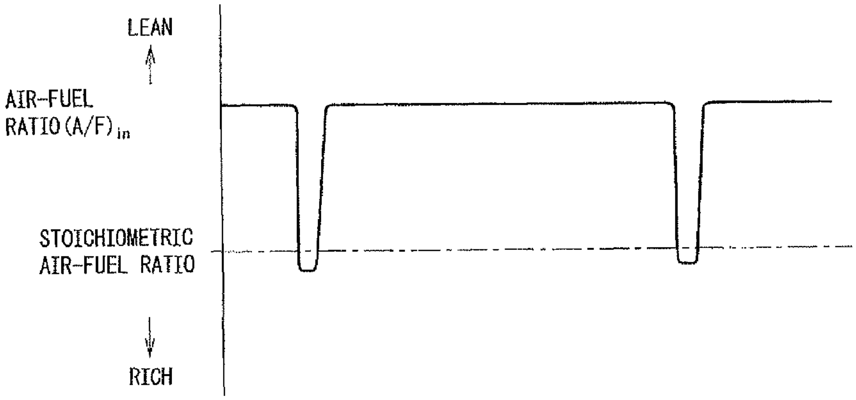
FIG. 8 is a view which shows changes in an air-fuel ratio of exhaust which flows into a downstream side catalyst of the second $NO_X$ removal method.

FIG. 8 shows the case of making the air-fuel ratio (A/F)in of the exhaust which flows into the exhaust purification catalyst 13 temporarily rich slightly before the $NO_X$ absorption ability of the basic layer 57 becomes saturated. Note that, in the example which is shown in FIG. 8, the time interval of this rich control is 1 minute or more. In this case, the $NO_X$ which was absorbed inside the basic layer 57 when the air-fuel ratio (A/F)in of the exhaust is lean is released all at once from the basic layer 57 and reduced when the air-fuel ratio (A/F)in of the exhaust is made temporarily rich. Therefore, in this case, the basic layer 57 performs the role of an absorbent for temporarily absorbing the $NO_X$.

Note that, at this time, sometimes the basic layer 57 temporarily adsorbs the $NO_X$. Therefore, if using the term "storage" as a term including both absorption and adsorption, at this time the basic layer 57 performs the role of an $NO_X$ storage agent for temporarily storing the $NO_X$. That is, in this case, if referring to the ratio of the air and fuel (hydrocarbons) which are fed into the engine intake passage, combustion chambers 2, and exhaust passage upstream of the upstream side catalyst 61 as the "air-fuel ratio of the exhaust", the downstream side catalyst 62 functions as an $NO_X$ storage catalyst which stores the $NO_X$ when the air-fuel ratio of the exhaust is lean and releases the stored $NO_X$ when the concentration of oxygen in the exhaust falls.

Figure 9:
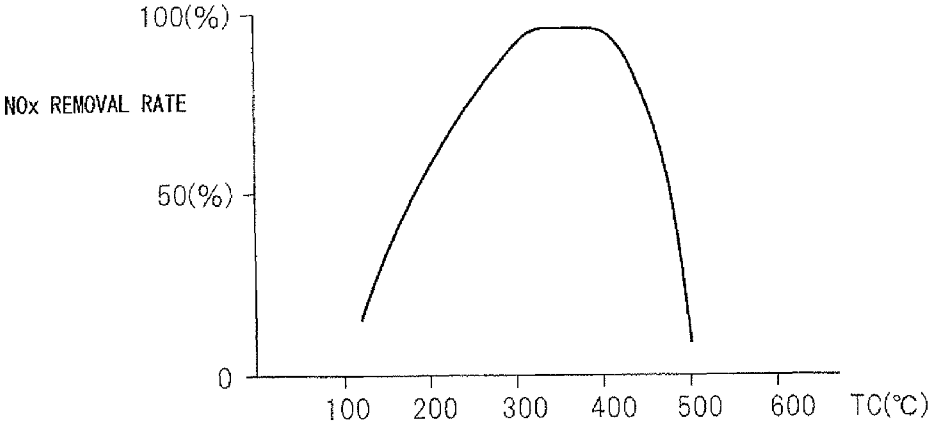
FIG. 9 is a view which shows an $NO_X$ removal rate in the second $NO_X$ removal method.

FIG. 9 shows the $NO_X$ removal rate when making the exhaust purification catalyst function as an $NO_X$ storage catalyst in this way. Note that, the abscissa of FIG. 9 indicates the catalyst temperature TC of the downstream side catalyst 62. When making the exhaust purification catalyst 13 function as an $NO_X$ storage catalyst, as shown in FIG. 9, when the temperature TC of the downstream side catalyst 62 is from 300° C. to 400° C., an extremely high $NO_X$ removal rate is obtained, but if the catalyst temperature TC becomes a 400° C. or more high temperature, the $NO_X$ removal rate falls.

In this way, the $NO_X$ removal rate falls if the catalyst temperature TO becomes 400° C. or more because if the catalyst temperature TC becomes 400° C. or more, nitrates break down by heat and are released in the form of $NO_2$ from the downstream side catalyst 62. That is, so long as storing $NO_X$ in the form of nitrates, when the catalyst temperature TC is high, a high $NO_X$ removal rate is hard to obtain. However, in the new $NO_X$ removal method which is shown from FIG. 4 to FIG. 6A and FIG. 6B, as will be understood from FIG. 6A and FIG. 6B, nitrates are not produced or even if produced are extremely small in amount. Therefore, as shown in FIG. 5, even when the catalyst temperature TC is high, a high $NO_X$ removal rate is obtained.

In this way, the exhaust purification system of the present embodiment has the property of reducing the $NO_X$ which is contained in the exhaust if making the concentration of hydrocarbons which flow into the exhaust purification catalyst 13 vibrate by within a predetermined range of amplitude and by within a predetermined range of period. Further, the exhaust purification system of the present embodiment has the property of the amount of storage of $NO_X$ which is contained in the exhaust increasing if making the vibration period of the concentration of hydrocarbons which flow into the exhaust purification catalyst 13 longer than a predetermined range.

The $NO_X$ removal method which is shown from FIG. 4 to FIG. 6A and FIG. 6B can be said to be a new $NO_X$ removal method designed to remove the $NO_X$ without forming almost any nitrates when using a catalyst which carries precious metal catalyst particles and forms a basic layer which can absorb the $NO_X$. In actuality, when using this new $NO_X$ removal method, the amount of nitrates which are detected from the basic layer 57 becomes extremely small compared to when making the exhaust purification catalyst 13 function as an $NO_X$ storage catalyst. Note that, this new $NO_X$ removal method will be referred to below as the "first $NO_X$ removal method". The internal combustion engine in the present embodiment is formed to remove $NO_X$ by the first $NO_X$ removal method by making the concentration of hydrocarbons which flow into the exhaust purification catalyst 13 vibrate by within a predetermined range of amplitude and by within a predetermined range of period.

Next, this first $NO_X$ removal method will be explained in a bit more detail while referring to FIG. 10 to FIG. 15.

Figure 10:
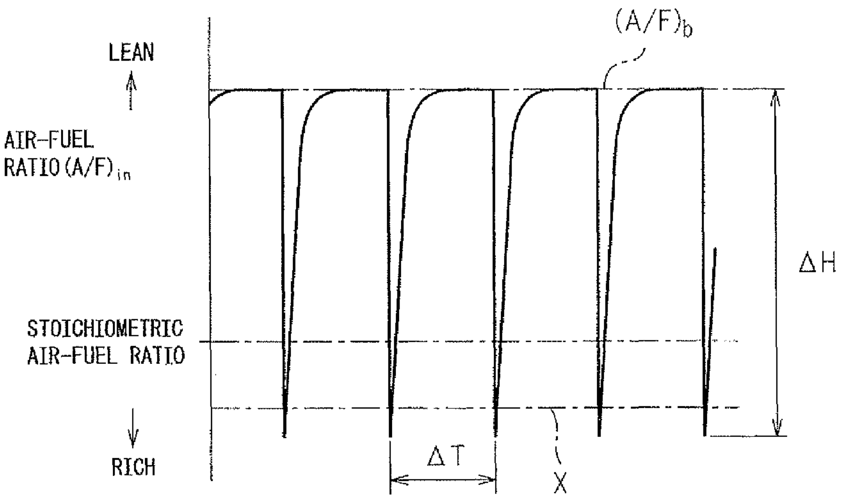
FIG. 10 is a time chart which shows changes in the air-fuel ratio of exhaust which flows into an exhaust purification catalyst in the first $NO_X$ removal method.

FIG. 10 shows the change in the air-fuel ratio (A/F)in which is shown in FIG. 4 enlarged. Note that, as explained above, the change in the air-fuel ratio (A/F)in of the exhaust which flows into the exhaust purification catalyst 13 simultaneously shows the change in the concentration of hydrocarbons which flow into the exhaust purification catalyst 13. Note that, in FIG. 10, ΔH shows the amplitude of the change in concentration of the hydrocarbons HO which flow into the exhaust purification catalyst 13, while ΔT shows the vibration period of the concentration of hydrocarbons which flow into the exhaust purification catalyst 13.

Furthermore, in FIG. 10, (A/F)b expresses the base air-fuel ratio which shows the air-fuel ratio of the combustion gas for generating the engine output. In other words, this base air-fuel ratio (A/F)b expresses the air-fuel ratio of the exhaust which flows into the exhaust purification catalyst 13 when stopping the feed of hydrocarbons. On the other hand, in FIG. 10, X shows the upper limit of the air-fuel ratio (A/F)in which enables production of a sufficient amount of reducing intermediates from the active $NO_X$ and reformed hydrocarbons and enables reaction of the active $NO_X$ with the reducing intermediates without causing it to be stored in the form of nitrates in the basic layer 57. To cause production of a sufficient amount of reducing intermediates from the active $NO_X$ and reformed hydrocarbons and cause reaction of the active $NO_X$ with the reducing intermediates without causing it to be stored in the form of nitrates in the basic layer 57, it is necessary to make the air-fuel ratio (A/F)in lower than the upper limit X of the air-fuel ratio.

In other words, X of FIG. 10 expresses the lower limit of the concentration of hydrocarbons which is necessary for production of a sufficient amount of reducing intermediates and reacting the active $NO_X$ with the reducing intermediates. To cause production of a sufficient amount of reducing intermediates and cause reaction of the active $NO_X$ with the reducing intermediates, it is necessary to raise the concentration of hydrocarbons to above this lower limit X as well. In this case, whether a sufficient amount of reducing intermediates is produced and the active $NO_X$ reacts with the reducing intermediates is determined by the ratio between the concentration of oxygen around the active $NO_X$ and the concentration of hydrocarbons, that is, the air-fuel ratio (A/F)in. The above-mentioned upper limit X of the air-fuel ratio which is necessary for causing production of a sufficient amount of reducing intermediates and causing the active $NO_X$ to react with the reducing intermediates will be referred to below as the "demanded minimum air-fuel ratio".

Figure 11:
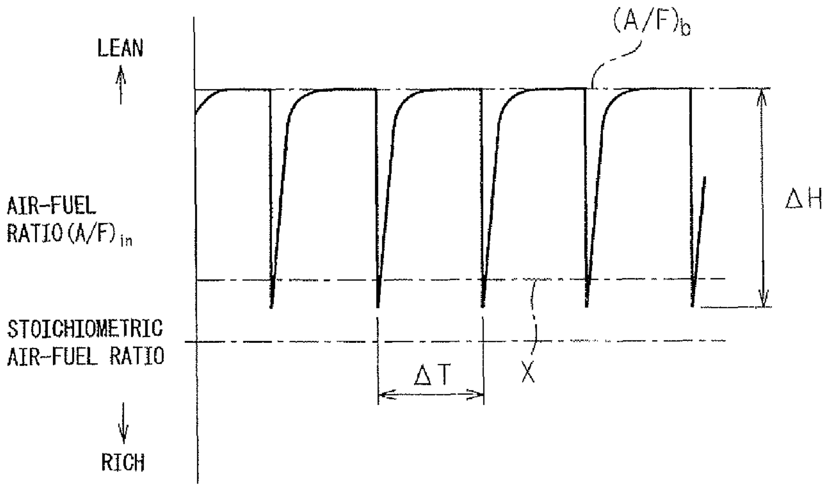
FIG. 11 is another time chart which shows changes in the air-fuel ratio of exhaust which flows into an exhaust purification catalyst in the first $NO_X$ removal method.

In the example which is shown in FIG. 10, the demanded minimum air-fuel ratio X becomes rich. Therefore, in this case, to cause production of a sufficient amount of reducing intermediates and make the active $NO_X$ react with the reducing intermediates, the air-fuel ratio (A/F)in is instantaneously made the demanded minimum air-fuel ratio X or less, that is, rich. As opposed to this, in the example which is shown in FIG. 11, the demanded minimum air-fuel ratio X is lean. In this case, the air-fuel ratio (A/F)in is maintained lean while periodically lowering the air-fuel ratio (A/F)in so as to produce a sufficient amount of reducing intermediates and react the active $NO_X$ with the reducing intermediates.

In this case, whether the demanded minimum air-fuel ratio X becomes rich or lean depends on the oxidizing power of the upstream side catalyst 61. In this case, the upstream side catalyst 61 for example becomes stronger in oxidizing power if increasing the amount of precious metal carried and becomes stronger in oxidizing power if strengthening the acidity. Therefore, the oxidizing power of the upstream side catalyst 61 changes depending on the amount of the precious metal carried or the strength of the acidity.

Now, when using an upstream side catalyst 61 with a strong oxidizing power, as shown in FIG. 11, if maintaining the air-fuel ratio (A/F)in lean while periodically lowering the air-fuel ratio (A/F)in, when the air-fuel ratio (A/F)in is lowered, the hydrocarbons end up being completely oxidized and as a result the reducing intermediates can no longer be produced. As opposed to this, when using an upstream side catalyst 61 with a strong oxidizing power, as shown in FIG. 10, if periodically making the air-fuel ratio (A/F)in rich, the hydrocarbons are partially oxidized without being completely oxidized when the air-fuel ratio (A/F)in is made rich, that is, the hydrocarbons are reformed, and therefore a sufficient amount of reducing intermediates is produced and the active $NO_X$ is made to react with the reducing intermediates. Therefore, when using an upstream side catalyst 61 with a strong oxidizing power, the demanded minimum air-fuel ratio X has to be made rich.

On the other hand, when using an upstream side catalyst 61 with a weak oxidizing power, as shown in FIG. 11, if maintaining the air-fuel ratio (A/F)in lean while periodically lowering the air-fuel ratio (A/F)in, the hydrocarbons are partially oxidized without being completely oxidized, that is, the hydrocarbons are reformed, and therefore a sufficient amount of reducing intermediates is produced and the active $NO_X$ is made to react with the reducing intermediates. As opposed to this, if using an upstream side catalyst 61 with a weak oxidizing power, as shown in FIG. 10, if making the air-fuel ratio (A/F)in periodically rich, a large amount of hydrocarbons is simply exhausted from the upstream side catalyst 61 without being oxidized and therefore the amount of hydrocarbons which is wastefully consumed increases. Therefore, when using an upstream side catalyst 61 with a weak oxidizing power, the demanded minimum air-fuel ratio X must be made lean.

Figure 12:
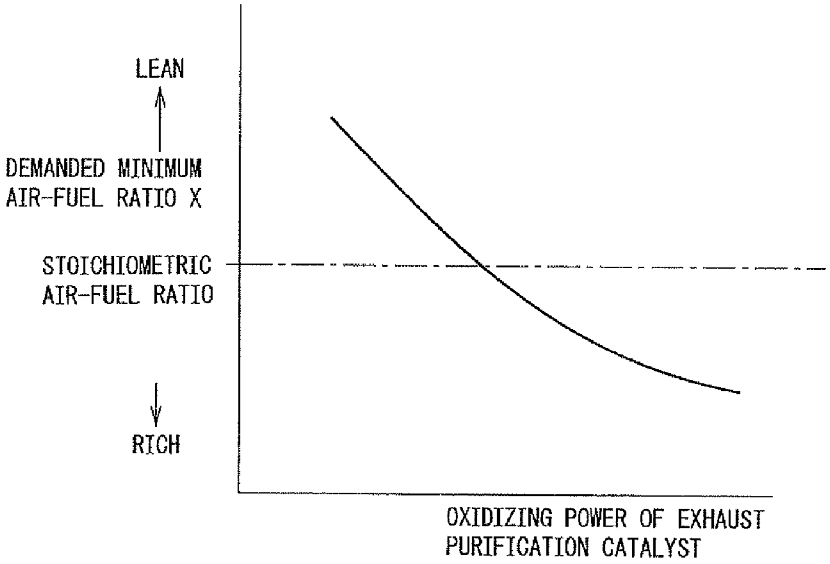
FIG. 12 is a view which shows the relationship between the oxidizing power of an exhaust purification catalyst and a demanded minimum air-fuel ratio X in the first $NO_X$ removal method.

That is, it is learned that the demanded minimum air-fuel ratio X, as shown in FIG. 12, has to be lowered the stronger the oxidizing power of the upstream side catalyst 61. In this way, the demanded minimum air-fuel ratio X is made lean or rich by the oxidizing power of the upstream side catalyst 61, but below the case where the demanded minimum air-fuel ratio X is rich will be used as an example to explain the amplitude of the change in the concentration of hydrocarbons which flow into the exhaust purification catalyst 13 or the vibration period of the concentration of hydrocarbons which flow into the exhaust purification catalyst 13.

Now then, if the base air-fuel ratio (A/F)b becomes larger, that is, if the concentration of oxygen in the exhaust before the hydrocarbons are fed becomes higher, the amount of feed of hydrocarbons required for making the air-fuel ratio (A/F)in the demanded minimum air-fuel ratio X or less increases. Therefore, the higher the concentration of oxygen in the exhaust before hydrocarbons are fed, the larger the amplitude of the concentration of hydrocarbons has to be made.

Figure 13:
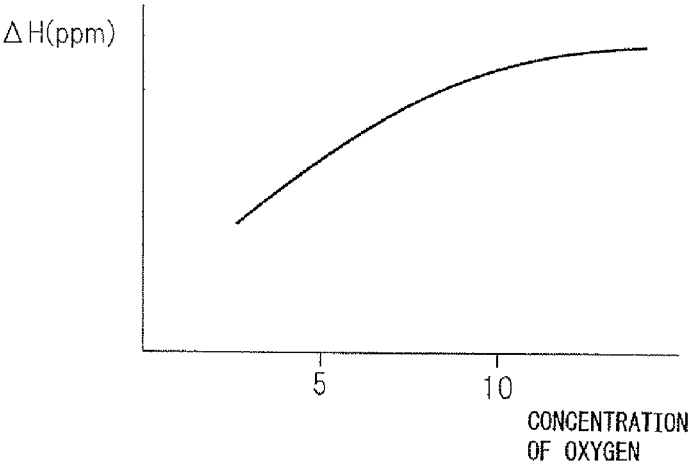
FIG. 13 is a view which shows the relationship between a concentration of oxygen in exhaust and an amplitude ΔH of the concentration of hydrocarbons which gives the same $NO_X$ removal rate in the first $NO_X$ removal method.

FIG. 13 shows the relationship between the concentration of oxygen in the exhaust before hydrocarbons are fed and the amplitude ΔH of the concentration of hydrocarbons when the same $NO_X$ removal rate is obtained. From FIG. 13, it is learned that to obtain the same $NO_X$ removal rate, the higher the concentration of oxygen in the exhaust before hydrocarbons are fed, the more the amplitude ΔH of the concentration of hydrocarbons has to be increased. That is, to obtain the same $NO_X$ removal rate, the higher the base air-fuel ratio (A/F)b, the more the amplitude ΔH of the concentration of hydrocarbons has to be increased. In other words, to remove the $NO_X$ well, it is possible to reduce the amplitude ΔH of the concentration of hydrocarbons the lower the base air-fuel ratio (A/F)b becomes.

Figure 14:
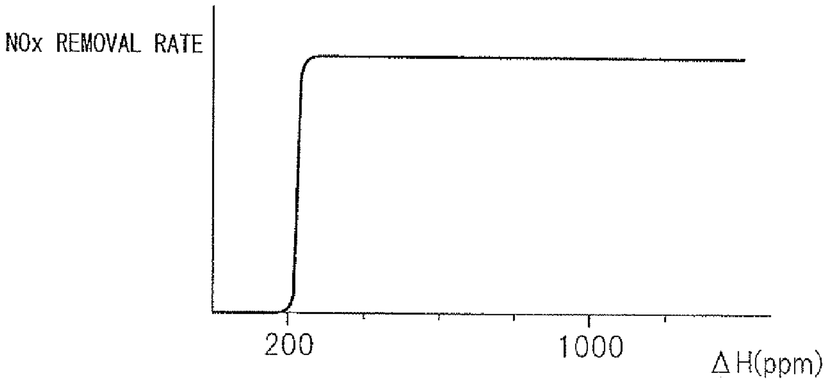
FIG. 14 is a view which shows the relationship between an amplitude ΔH of the concentration of hydrocarbons and an $NO_X$ removal rate in the first $NO_X$ removal method.

In this regard, the base air-fuel ratio (A/F)b becomes the lowest at the time of acceleration operation. At this time, if the amplitude ΔH of the concentration of hydrocarbons is 200 ppm or so, $NO_X$ can be removed well. The base air-fuel ratio (A/F)b usually becomes larger than the time of acceleration operation. Therefore, as shown in FIG. 14, a good $NO_X$ removal rate can be obtained if the amplitude ΔH of the concentration of hydrocarbon is 200 ppm or more.

On the other hand, it is learned that when the base air-fuel ratio (A/F)b is the highest, if making the amplitude ΔH of the concentration of hydrocarbons 10000 ppm or so, a good $NO_X$ removal rate can be obtained. Therefore, in the present invention, the predetermined range of amplitude of the concentration of hydrocarbons is made 200 ppm to 10000 ppm.

Figure 15:
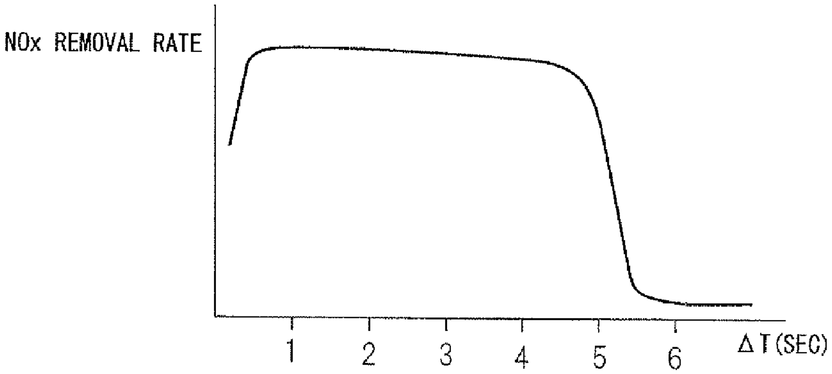
FIG. 15 is a view which shows the relationship between a vibration period ΔT of the concentration of hydrocarbons and an $NO_X$ removal rate in the first $NO_X$ removal method.

Further, if the vibration period of the concentration of hydrocarbons becomes longer, the concentration of oxygen around the active $NO_X$ becomes higher in the interval after hydrocarbons are fed to when hydrocarbons are next fed. In this case, if the vibration period of the concentration of hydrocarbons becomes longer than 5 seconds or so, the active $NO_X$ starts to be absorbed inside the basic layer 57 in the form of nitrates. Therefore, as shown in FIG. 15, if the vibration period of the concentration of hydrocarbons becomes longer than 5 seconds or so, the $NO_X$ removal rate falls. Therefore, the vibration period of the concentration of hydrocarbons has to be made 5 seconds or less.

On the other hand, if the vibration period of the concentration of hydrocarbons becomes about 0.3 second or less, the fed hydrocarbons start to build up on the exhaust purification catalyst 13. Therefore, as shown in FIG. 15, if the vibration period of the concentration of hydrocarbons becomes about 0.3 second or less, the $NO_X$ removal rate falls. Therefore, in the present invention, the vibration period of the concentration of hydrocarbons is made an interval of 0.3 second to 5 seconds.

Figure 16:
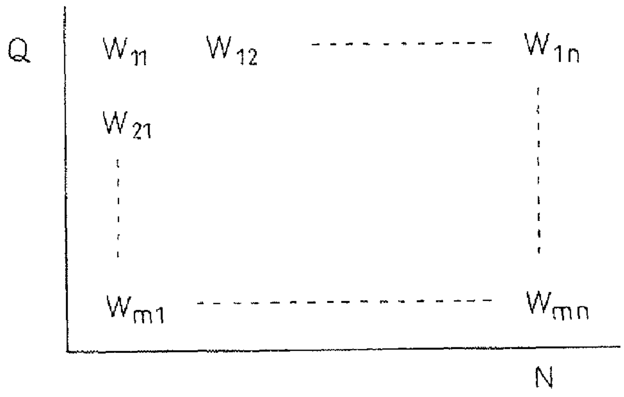
FIG. 16 is a view which shows a map of a hydrocarbon feed amount W in the first $NO_X$ removal method.

Now, in the present invention, control is performed to change the amount of feed of hydrocarbons and injection timing from the hydrocarbon feed valve 15 so that the amplitude ΔH of the concentration of hydrocarbons and the vibration period ΔT become the optimum values corresponding to the operating state of the engine. In this case, in an embodiment of the present invention, the amount of feed W of hydrocarbons which can give the optimum amplitude ΔH of the concentration of hydrocarbons is stored in advance inside the ROM 32 as a function of the amount of injection Q from the fuel injectors 3 and the engine speed N in the form of a map as shown in FIG. 16. Further, the optimum vibration amplitude ΔT of the concentration of hydrocarbons, that is, injection period ΔT of hydrocarbons, is similarly stored as a function of the amount of injection Q and engine speed N in the form of a map in the ROM 32.

Next, referring to FIG. 17 to FIG. 20, the method of removal of $NO_X$ when making the exhaust purification catalyst 13 function as an $NO_X$ storage catalyst will be explained in detail. The method of $NO_X$ removal when making the exhaust purification catalyst 13 function as an $NO_X$ storage catalyst in this way will be referred to below as the "second $NO_X$ removal method".

Figure 17:
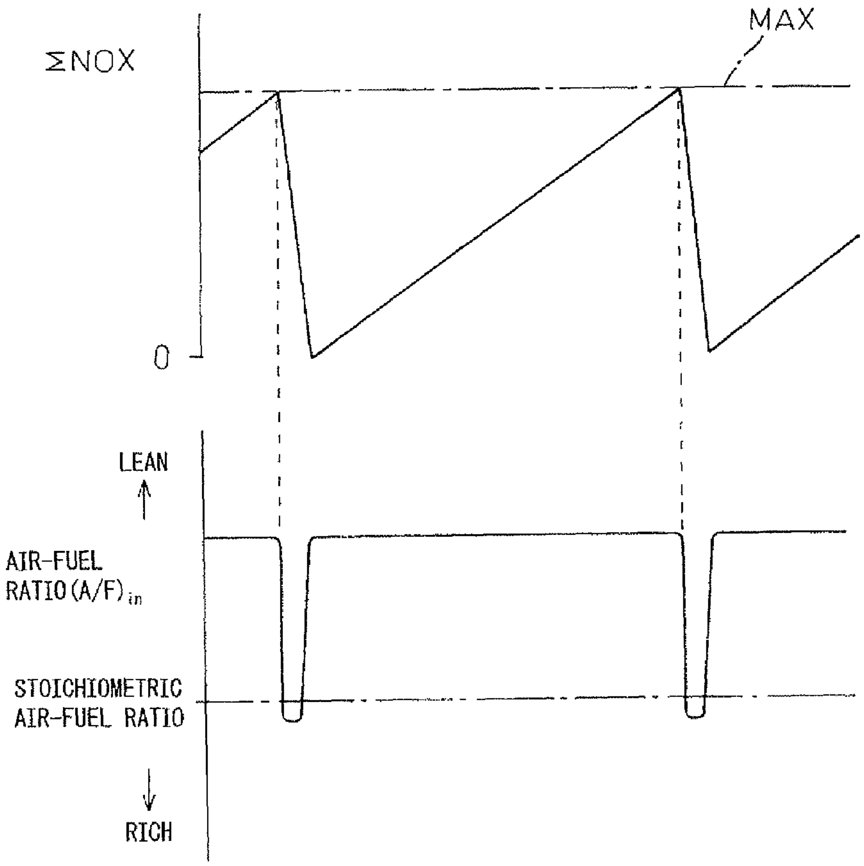
FIG. 17 is a view which shows an amount of $NO_X$ which is stored in the exhaust purification catalyst and a change of the air-fuel ratio of exhaust which flows into the exhaust purification catalyst in the second $NO_X$ removal method.

In this second $NO_X$ removal method, as shown in FIG. 17, when the stored $NO_X$ amount ΣNOX which is stored in the basic layer 57 exceeds a predetermined allowable amount MAX, the air-fuel ratio (A/F)in of the exhaust which flows into the exhaust purification catalyst 13 is temporarily made rich. If the air-fuel ratio (A/F)in of the exhaust is made rich, the $NO_X$ which was stored in the basic layer 57 when the air-fuel ratio (A/F)in of the exhaust was lean is released all at once from the basic layer 57 and reduced. Due to this, the $NO_X$ is removed.

Figure 18:
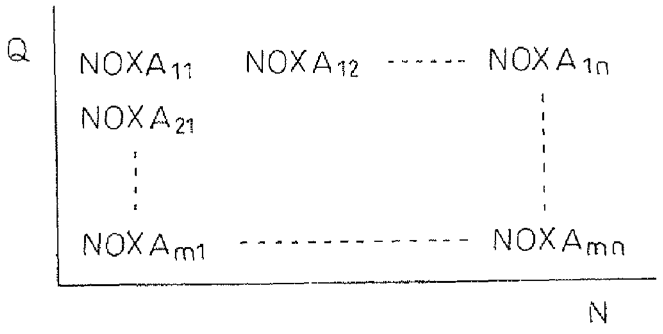
FIG. 18 is a view which shows a map of an $NO_X$ amount NOXA which is exhausted from an engine body.

The stored $NO_X$ amount ΣNOX, for example, is calculated from the amount of $NO_X$ which is exhausted from the engine. In an embodiment according to the present invention, the exhausted $NO_X$ amount NOXA which is exhausted from the engine per unit time is stored as a function of the amount of injection Q and engine speed N in the form of the map such as shown in FIG. 18 in advance in the ROM 32. The stored $NO_X$ amount ΣNOX is calculated from this exhausted $NO_X$ amount NOXA. In this case, as explained above, the period during which the air-fuel ratio (A/F)in of the exhaust is made rich is usually 1 minute or more.

Figure 19:
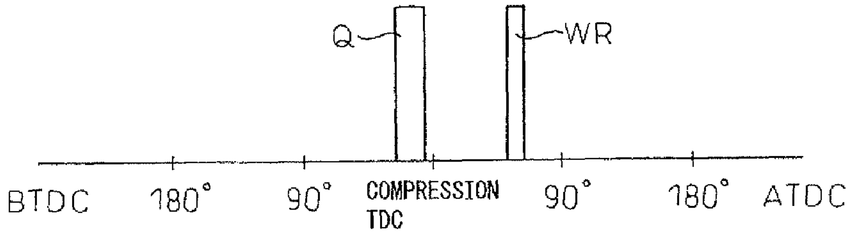
FIG. 19 is a view which shows a fuel injection timing in a combustion chamber in the second $NO_X$ removal method.
Figure 20:
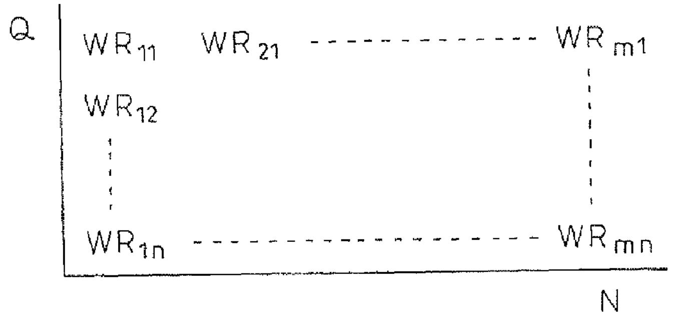
FIG. 20 is a view which shows a map of a hydrocarbon feed amount WR in the second $NO_X$ removal method.

In this second $NO_X$ removal method, as shown in FIG. 19, by performing auxiliary injection which injects additional fuel WR in addition to the main injection which injects combustion use fuel Q into the combustion chambers 2 from the fuel injectors 3, the air-fuel ratio (A/F)in of the exhaust which flows into the exhaust purification catalyst 13 is made rich. Note that, the abscissa shows the crank angle. In the example which is shown in FIG. 19, fuel WR is injected at a timing where it burns, but does not become engine output, that is, slightly before ATDC90° after top dead center of compression. This amount of fuel WR is stored as a function of the amount of injection Q and engine speed N in the form of the map such as shown in FIG. 20 in advance in the ROM 32. Of course, in this case, it is possible to increase the amount of feed of hydrocarbons from the hydrocarbon feed valve 15 so as to make the air-fuel ratio (A/F)in of the exhaust rich.

In this regard, the exhaust purification system of an internal combustion engine in the present embodiment is provided with a temperature raising device which raises the temperature of the upstream side catalyst 61. The temperature raising device in the present embodiment includes an electric heater. In the present embodiment, the substrate of the upstream side catalyst 61 functions as an electric heater. That is, the upstream side catalyst 61 in the present embodiment is comprised of an electric heating catalyst.

Figure 21A:
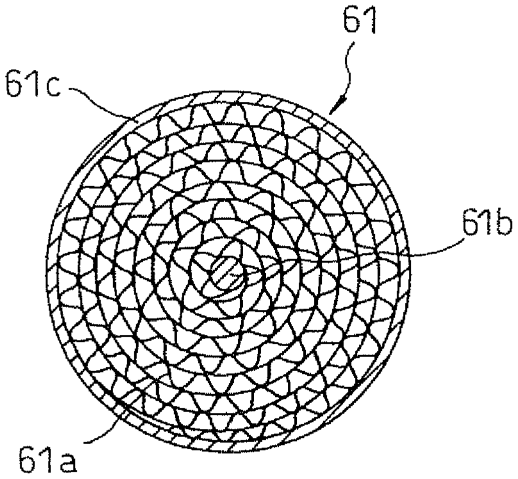
FIG. 21A is a schematic front view of an upstream side catalyst of a first exhaust purification catalyst in an embodiment.
Figure 21B:
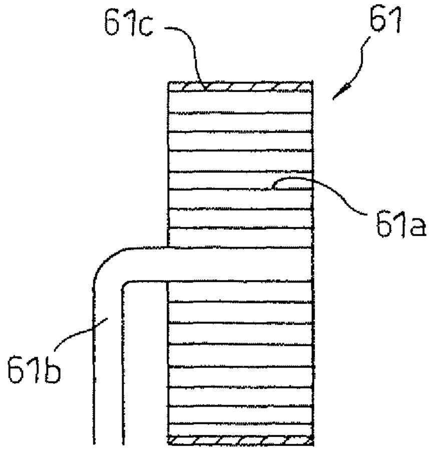
FIG. 21B is a schematic cross-sectional view of an upstream side catalyst of a first exhaust purification catalyst in an embodiment.

FIG. 21A shows a schematic front view of an upstream side catalyst of the first exhaust purification catalyst in the present embodiment. FIG. 21B shows a schematic cross-sectional view of an upstream side catalyst of the first exhaust purification catalyst in the present embodiment. The upstream side catalyst 61 includes a substrate 61*a* for carrying the catalyst particles and an outer tube 61*c* which is arranged around the substrate 61*a* and is formed so as to hold the substrate 61*a*. The substrate 61*a* includes cylindrically shaped plate members which are arranged concentrically and wave-shaped plate members which are arranged between these cylindrically shaped plate members. Between these plate-shaped members, exhaust channels are formed. At the wall surfaces of these exhaust channels, a catalyst carrier and catalyst particles are arranged.

At the approximate center of the substrate 61*a*, a center electrode 61*b* is arranged. The upstream side catalyst 61 in the present embodiment is comprised so that the substrate 61*a* becomes a resistor. The temperature control device is formed to apply voltage between the center electrode 61*b* and the outer tube 61*c*. By applying voltage between the center electrode 61*b* and the outer tube 61*c*, the substrate 61*a* generates heat. In this way, the first exhaust purification catalyst in the present embodiment is formed so that by electrifying the upstream side catalyst 61, the upstream side catalyst 61 itself generates heat and rises in temperature. The electrification of the upstream side catalyst 61 is controlled by the electronic control unit 30.

The configuration of the electric heating catalyst is not limited to this. It is possible to employ any structure which generates heat by the supply of voltage. For example, in the substrate of the upstream side catalyst in the present embodiment, the plate shaped members are formed from metal, but the invention is not limited to this. The substrate may also be formed from cordierite or another material which has heat resistance. Further, for the configuration of the electrodes, it is possible to employ any configuration which enables application of voltage to the substrate.

The first exhaust purification catalyst 13 in the present embodiment is designed to feed the downstream side catalyst 62 with reformed hydrocarbons which are obtained by partially oxidizing at least part of the hydrocarbons at the upstream side catalyst 61 when performing the first $NO_X$ removal method. For this reason, at the upstream side catalyst 61, it is preferable to partially oxidize a large amount of hydrocarbons.

In this regard, in the time period when operating by the first $NO_X$ removal method of the present embodiment, sometimes the temperature of the upstream side catalyst 61 falls. In particular, sometimes the temperature of the upstream side end of the upstream side catalyst 61 greatly falls. Alternatively, when operating by the first $NO_X$ removal method, sometimes the temperature of the upstream side catalyst 61 falls. That is, right before operating by the first $NO_X$ removal method, sometimes the temperature of the upstream side catalyst 61 falls.

For example, when shifting to acceleration operation when engaged in steady operation with a substantially constant demanded load, sometimes the engine speed increases and the flow rate of the exhaust which is exhausted from the engine body 1 rapidly increases. At steady operation, hydrocarbons are intermittently fed from the hydrocarbon feed valve 15 and exhaust with a lean air-fuel ratio of the exhaust flows into the upstream side catalyst 61. At the upstream side catalyst 61, an oxidation reaction occurs. For this reason, in steady operation, the state where the temperature of the upstream side catalyst 61 becomes higher than the temperature of the exhaust which flows into the upstream side catalyst 61 is maintained. In this regard, if the flow rate of the exhaust which flows into the upstream side catalyst 61 increases, the exhaust removes much of the heat from the upstream side catalyst 61, so the temperature of the upstream side catalyst 61 falls. The upstream side catalyst 61 gradually falls in temperature from the upstream side end to the downstream side end.

Alternatively, in the exhaust purification system of the present embodiment, when raising the temperature of any device which treats the exhaust, sometimes the temperature of the upstream side catalyst 61 greatly falls. For example, the exhaust purification system of the present embodiment arranges the particulate filter 63 downstream of the exhaust purification catalyst 13. In the particulate filter 63 of the present embodiment, the output of the differential pressure sensor 64 can be used as the basis to estimate the amount of particulate which has built up on the particulate filter 63. Regeneration control can be performed so that when the amount of particulate which builds up on the particulate filter 63 becomes larger than a predetermined judgment value, the particulate filter 63 is raised in temperature and the amount of buildup of particulate is reduced.

When raising the temperature of the particulate filter 63, for example, by feeding a greater amount of hydrocarbons from the hydrocarbon feed valve 15 than necessary for removal of $NO_X$, it is possible to cause an oxidation reaction at the exhaust purification catalyst 13 so as to raise the temperature of the exhaust. By the temperature of the exhaust rising, it is possible to raise the temperature of the particulate filter 63 higher than the temperature at which particulate can be removed. In this regard, the hydrocarbons which are fed from the hydrocarbon feed valve 15 are liquid. If a large amount of hydrocarbons are fed from the hydrocarbon feed valve 15, sometimes they will deposit at the upstream end of the upstream side catalyst 61. That is, sometimes the hydrocarbons will physically be adsorbed at the upstream side catalyst 61 in a liquid state. For this reason, sometimes the temperature of the upstream side catalyst 61 will drop.

Furthermore, when using the exhaust purification catalyst 13 to remove $NO_X$ by the second $NO_X$ removal method, the basic layer of the downstream side catalyst 62 will store $SO_X$ together with the $NO_X$. The $SO_X$ which gradually builds up along with operation of the internal combustion engine can be released from the basic layer by making the air-fuel ratio of the inflowing exhaust gas the stoichiometric air-fuel ratio or rich in the state where the temperature of the downstream side catalyst 62 is made a higher temperature than a predetermined temperature. In control for releasing $SO_X$ from the downstream side catalyst 62 as well, to raise the temperature of the downstream side catalyst 62, sometimes a large amount of hydrocarbons is fed from the hydrocarbon feed valve 15. When performing control for releasing $SO_X$ as well, sometimes hydrocarbons are adsorbed at the upstream side catalyst 61 and the temperature of the upstream side catalyst 61 falls.

In this way, due to changes in the operating state of an internal combustion engine, sometimes the temperature of the upstream side catalyst 61 will greatly fall and will drop to below the temperature where hydrocarbons can be partially oxidized. That is, sometimes the upstream side catalyst 61 will be deactivated. If the temperature of the upstream side catalyst 61 becomes less than the temperature where hydrocarbons can be partially oxidized, sometimes it will not be possible to sufficiently partially oxidize the hydrocarbons at the upstream side catalyst 61 and the reformed hydrocarbons which are fed to the downstream side catalyst 62 will become insufficient. As a result, sometimes the $NO_X$ removal rate at the exhaust purification catalyst 13 will fall.

The exhaust purification system which is provided with the first exhaust purification catalyst of the present embodiment sets the first judgment temperature based on the temperature at which the upstream side catalyst 61 can partially oxidize hydrocarbons by a predetermined efficiency. The first judgment temperature of the first exhaust purification catalyst in the present embodiment is set to a temperature at which the upstream side catalyst can partially oxidize the hydrocarbons by a predetermined efficiency. The first judgment temperature of the first exhaust purification catalyst in the present embodiment can, for example, be set to about 250° C.

Further, the exhaust purification system which is provided with the first exhaust purification catalyst of the present embodiment sets the second judgment temperature based on the temperature at which the downstream side catalyst 62 can react the reducing intermediates and active $NO_X$ by a predetermined efficiency. The second judgment temperature in the present embodiment can be set to a temperature at which the catalyst can react the reducing intermediates and active $NO_X$ by a predetermined efficiency. The efficiency of the reaction between the reducing intermediates and active $NO_X$ here includes the efficiency of production of the reducing intermediates. The second judgment temperature of the first exhaust purification catalyst in the present embodiment can, for example, be set to about 300° C. The second judgment temperature in the present embodiment is set higher than the first judgment temperature. Note that, in the first exhaust purification catalyst, the downstream side catalyst 62 produces the reducing intermediates, but it can also sufficiently produce reducing intermediates at the temperature at which it reacts the reducing intermediates and active $NO_X$ by a predetermined efficiency.

The setting of the first judgment temperature is not limited to this. It is possible to employ a temperature near the temperature at which the catalyst can partially oxidize hydrocarbons by a predetermined efficiency. For example, the temperature at which the catalyst can partially oxidize hydrocarbons by a predetermined efficiency plus a safety margin may also be set. The same is true for setting the second judgment temperature. For example, it is possible to employ the temperature near the temperature at which the catalyst can react the reducing intermediates and active $NO_X$ by a predetermined efficiency.

The first judgment temperature in the present embodiment changes depending on the type of the upstream side catalyst and the type etc. of the fed hydrocarbons. Further, the second judgment temperature in the present embodiment changes depending on the type of the downstream side catalyst and the type etc. of the fed hydrocarbons. For this reason, it is preferable to set the first judgment temperature and the second judgment temperature in accordance with the configuration of exhaust purification catalyst of the internal combustion engine and the type etc. of the hydrocarbons fed.

When, depending on the operating state of the internal combustion engine, the temperature of the upstream side catalyst 61 becomes less than the first judgment temperature and the temperature of the downstream side catalyst 62 becomes higher than the second judgment temperature, the upstream side catalyst 61 cannot partially oxidize a sufficient amount of hydrocarbons, so the reformed hydrocarbons which are fed to the downstream side catalyst 62 become insufficient. For this reason, even if the ability to produce reducing intermediates and the ability to react the reducing intermediates and active $NO_X$ are sufficient at the downstream side catalyst 62, the $NO_X$ removal rate falls.

In the internal combustion engine of the present embodiment, when the temperature of the upstream side catalyst 61 is less than the first judgment temperature and the temperature of the downstream side catalyst 62 is higher than the second judgment temperature, control is performed to raise the temperature of the upstream side catalyst 61. In the present embodiment, control is performed to raise the temperature of the upstream side catalyst 61 to the first judgment temperature or more. In the first exhaust purification catalyst 13 of the present embodiment, the upstream side catalyst 61 is comprised of an electric heating catalyst, so it is possible to perform control to electrify the upstream side catalyst 61 so as to raise the temperature of the upstream side catalyst 61.

Figure 22:
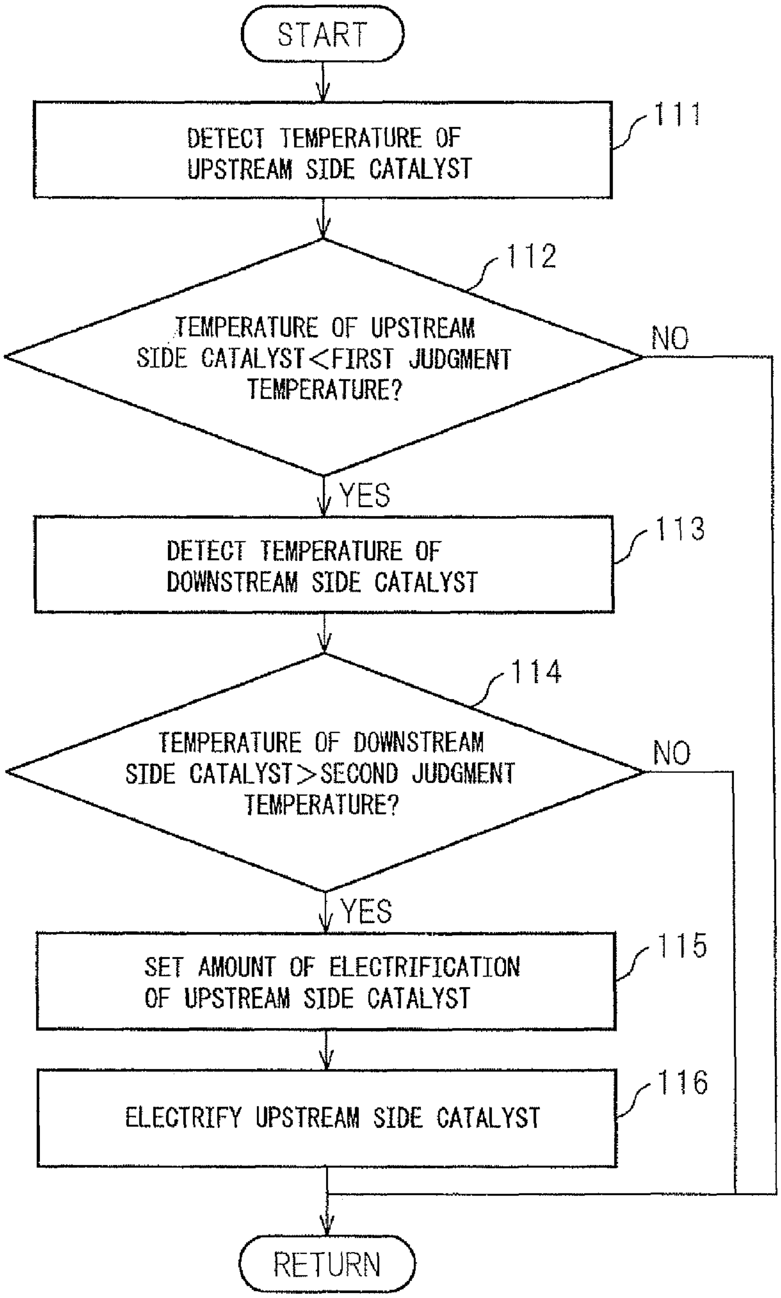
FIG. 22 is a flow chart of first operational control in an embodiment.

FIG. 22 shows a flow chart of operational control in the present embodiment. The operational control which is shown in FIG. 22 is, for example, repeated every predetermined time interval.

At step 111, the temperature of the upstream side catalyst 61 is detected. Referring to FIG. 1, the temperature of the upstream side catalyst 61 can be detected by the temperature sensor 23.

Next, at step 112, it is judged if the temperature of the upstream side catalyst 61 is less than the first judgment temperature. For the first judgment temperature of the first exhaust purification catalyst, a temperature at which upstream side catalyst 61 can partially oxidize the hydrocarbons by a predetermined efficiency is set. When, at step 112, the temperature of the upstream side catalyst 61 is the first judgment temperature or more, this control is ended. When the temperature of the upstream side catalyst 61 is less than the first judgment temperature, the routine proceeds to step 113.

At step 113, the temperature of the downstream side catalyst 62 is detected. Referring to FIG. 1, the temperature of the downstream side catalyst 62 can be detected by the temperature sensor 24.

At step 114, it is judged if the temperature of the downstream side catalyst 62 is higher than a second judgment temperature. As the second judgment temperature of the first exhaust purification catalyst, a temperature at which the downstream side catalyst 62 can react the reducing intermediates and active $NO_X$ by a predetermined efficiency is set. When, at step 114, the temperature of the downstream side catalyst 62 is the second judgment temperature or less, this control is ended. When, at step 114, the temperature of the downstream side catalyst 62 is higher than the second judgment temperature, the routine proceeds to step 115.

At step 115, the amount of electrification of the upstream side catalyst 61 is set. As the amount of electrification, for example, it is possible to set at least one of the voltage which is applied to the upstream side catalyst 61 and the electrification time. The amount of electrification can, for example, be set based on the first judgment temperature and the temperature of the upstream side catalyst 61. For example, it is possible to store a map of the amount of electrification as a function of the temperature difference between the first judgment temperature and the temperature of the upstream side catalyst 61 in advance in the electronic control unit 30. It is possible to set the amount of electrification of the upstream side catalyst 61 greater the larger the difference between the first judgment temperature and the temperature of the upstream side catalyst 61.

Next, at step 116, the amount of electrification which was set at step 115 is used as the basis to electrify the upstream side catalyst.

By electrifying the upstream side catalyst 61, it is possible to raise the temperature of the upstream side catalyst 61. The temperature of the upstream side catalyst 61 may be made a temperature enabling partial oxidation by a predetermined efficiency or more. The upstream side catalyst 61 can produce a sufficient amount of partially oxidized hydrocarbons required for reduction of the $NO_X$ and can feed them to the downstream side catalyst 62. As a result, it is possible to improve the rate of removal of $NO_X$ at the exhaust purification catalyst 13.

The temperature raising device of the present embodiment electrifies the upstream side catalyst which functions as an electric heating catalyst so as to raise the temperature of the upstream side catalyst, but the invention is not limited to this. The temperature raising device may use any device and any control to make the temperature of the upstream side catalyst rise.

In the first exhaust purification catalyst of the present embodiment, an oxidation catalyst is arranged at the upstream side and a catalyst on which precious metal catalyst particles are carried and which has basic exhaust flow surface parts is arranged at the downstream side, but the invention is not limited to this. For the upstream side catalyst, any catalyst which has an oxidation ability can be employed. Furthermore, for the upstream side catalyst, any catalyst which can partially oxidize and reform hydrocarbons can be employed. For example, the upstream side catalyst may have a configuration of catalyst particles similar to the configuration of catalyst particles of the three-way catalyst.

Next, a second exhaust purification catalyst in the present embodiment will be explained. The second exhaust purification catalyst is provided with the upstream side catalyst 61 and the downstream side catalyst 62. The upstream side catalyst 61 has a similar configuration to the downstream side catalyst of the first exhaust purification catalyst. That is, the upstream side catalyst 61 has precious metal catalyst particles and basic exhaust flow surface parts which are formed around the catalyst particles. The upstream side catalyst 61 has a basic layer in the same way as the downstream side catalyst 62. The downstream side catalyst 62 has a similar configuration to the downstream side catalyst of the first exhaust purification catalyst.

By the second exhaust purification catalyst performing the first $NO_X$ removal method in the present embodiment, it is possible to produce reducing intermediates at the upstream side catalyst 61. That is, when the concentration of hydrocarbons in the exhaust which flows to the upstream side catalyst 61 is low, the $NO_X$ is activated and active $NO_X$ is produced. The produced active $NO_X$ is held on the surface of the basic layer. If the concentration of hydrocarbons of the exhaust becomes higher, the hydrocarbons are partially oxidized and radicals of hydrocarbons are produced. Further, the active $NO_X$ and the partially oxidized hydrocarbons react whereby reducing intermediates are produced. The reducing intermediates which are produced at the upstream side catalyst 61 can be fed to the downstream side catalyst 62. At the downstream side catalyst 62, the fed reducing intermediates and active $NO_X$ react whereby the $NO_X$ can be removed. Alternatively, the reducing intermediates which are produced at the upstream side catalyst 61 as well may be used to reduce and remove the $NO_X$.

Furthermore, in the second exhaust purification catalyst as well, it is possible to perform the second $NO_X$ removal method in the present embodiment. That is, it is possible to make the vibration period of the concentration of hydrocarbons longer than a predetermined range so as to make the upstream side catalyst 61 function as an $NO_X$ storage catalyst. Since the upstream side catalyst 61 and downstream side catalyst 62 can be made to function as $NO_X$ storage catalysts, when using the second $NO_X$ removal method to remove $NO_X$, the capacity of the $NO_X$ storage catalysts can be enlarged.

In an exhaust purification system which is provided with the second exhaust purification catalyst as well, like an exhaust purification system which is provided with the first exhaust purification catalyst, it is possible to perform the operational control which is shown in FIG. 22 in the present embodiment. Referring to FIG. 22, the first judgment temperature at step 112 can be set based on the temperature at which the upstream side catalyst 61 can produce reducing intermediates with a predetermined efficiency. The efficiency of production of reducing intermediates here includes the efficiency of the reaction by which the hydrocarbons are partially oxidized.

In the second exhaust purification catalyst of the present embodiment, the temperature at which the upstream side catalyst 61 can produce reducing intermediates by a predetermined efficiency is employed as the first judgment temperature. As the first judgment temperature in the second exhaust purification catalyst of the present embodiment, about 250° C. is employed. The second judgment temperature of the downstream side catalyst 62 at step 114, like in the first exhaust purification catalyst of the present embodiment, can be set based on the temperature at which the downstream side catalyst 62 can react the reducing intermediates and active $NO_X$ with a predetermined efficiency. For example, the second judgment temperature can be set to about 300° C.

When raising the temperature of the upstream side catalyst 61 at steps 115, 116, it is possible to raise the temperature so that the temperature of the upstream side catalyst 61 becomes the temperature at which the catalyst can produce reducing intermediates by a predetermined efficiency or more.

In this way, even when both the upstream side catalyst and downstream side catalyst are comprised of catalysts which have precious metal catalyst particles and basic exhaust flow surface parts, when the upstream side catalyst is less than the first judgment temperature and, furthermore, the temperature of the downstream side catalyst is higher than the second judgment temperature, control can be performed to raise the temperature of the upstream side catalyst. By this control, the upstream side catalyst can produce more reducing intermediates and feed them to the downstream side catalyst, so can raise the $NO_X$ removal rate.

Figure 23:
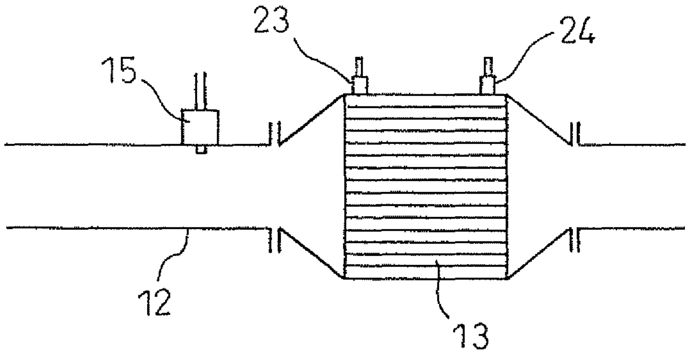
FIG. 23 is a schematic cross-sectional view of a third exhaust purification catalyst in an embodiment.

FIG. 23 is a schematic cross-sectional view of a third exhaust purification catalyst in the present embodiment. The first exhaust purification catalyst and second exhaust purification catalyst in the present embodiment are divided into upstream side catalysts and downstream side catalysts. The third exhaust purification catalyst 13 is comprised of an upstream side catalyst and a downstream side catalyst formed integrally. The third exhaust purification catalyst 13, like the downstream side catalyst of the first exhaust purification catalyst, has metal which has a catalytic action and basic exhaust flow surface parts which are formed around the catalyst particles. In the present embodiment, at the surface of the catalyst carrier, precious metal catalyst particles and a basic layer are arranged. That is, the third exhaust purification catalyst is comprised of the upstream side catalyst and the downstream side catalyst of the second exhaust purification catalyst joined together.

The third exhaust purification catalyst 13 is comprised of an electric heating catalyst. At the upstream side from the third exhaust purification catalyst 13, a hydrocarbon feed valve 15 is arranged. Hydrocarbons are fed to the engine exhaust passage. At the upstream side end of the exhaust purification catalyst 13, a temperature sensor 23 is arranged. At the downstream side end of the exhaust purification catalyst 13, a temperature sensor 24 is arranged.

The third exhaust purification catalyst 13 as well can remove $NO_X$ by the first $NO_X$ removal method the present embodiment. That is, it is possible to make the concentration of hydrocarbons which flow into the third exhaust purification catalyst 13 vibrate by within a predetermined range of amplitude and by within a predetermined range of period to remove the $NO_X$. In this case, if the third exhaust purification catalyst 13 is divided into an upstream part and a downstream part, the upstream part of the third exhaust purification catalyst 13 functions as the upstream side catalyst of the second exhaust purification catalyst. Furthermore, the downstream part of the third exhaust purification catalyst 13 functions as the downstream side catalyst in the second exhaust purification catalyst.

In the first $NO_X$ removal method, when the concentration of hydrocarbons which flow into the third exhaust purification catalyst 13 is low, active $NO_X$ is produced from the $NO_X$ which is contained in the exhaust. By making the concentration of the inflowing hydrocarbons higher, the hydrocarbons can be reformed. Further, the reformed hydrocarbons and active $NO_X$ react whereby the reducing intermediates are produced. By lowering the concentration of the inflowing exhaust gas, the reducing intermediates and active $NO_X$ can react and remove $NO_X$. Further, the third exhaust purification catalyst 13 can remove $NO_X$ by the second $NO_X$ removal method.

Furthermore, an exhaust purification system which is provided with the third exhaust purification catalyst 13 can perform the operational control which is shown in FIG. 22. In the third exhaust purification catalyst 13 as well, sometimes the temperature of the exhaust purification catalyst 13 becomes low under predetermined operating states of the internal combustion engine. In particular, sometimes the temperature of the upstream side end of the exhaust purification catalyst 13 becomes low. At this time, the substrate of the exhaust purification catalyst 13 is given a temperature gradient by which the temperature of the upstream side end is low and gradually becomes higher toward the downstream side.

In an exhaust purification system which is provided with the third exhaust purification catalyst 13 as well, it is possible to perform operational control similar to an exhaust purification system which is provided with the second exhaust purification catalyst. In the third exhaust purification catalyst 13, when the temperature of the upstream side end is less than the first judgment temperature and the temperature of the downstream side end is higher than the second judgment temperature, the third exhaust purification catalyst 13 can be electrified to raise the temperature of the upstream side end. The temperature of the upstream side end of the third exhaust purification catalyst 13 can be raised to become the temperature at which the catalyst can produce reducing intermediates by a predetermined efficiency or more.

Referring to FIG. 22, at step 111, it is possible to use the temperature sensor 23 to detect the temperature of the upstream side end of the third exhaust purification catalyst 13 as the temperature of the upstream side catalyst. At step 113, it is possible to use the temperature sensor 24 to detect the temperature of the downstream side end of the third exhaust purification catalyst 13 as the temperature of the downstream side catalyst.

The first judgment temperature at step 112, like in the second exhaust purification catalyst, can be set based on the temperature at which the third exhaust purification catalyst 13 can produce reducing intermediates with a predetermined efficiency. For example, it is possible to employ the temperature at which the third exhaust purification catalyst 13 can produce reducing intermediates with a predetermined efficiency as the first judgment temperature.

The second judgment temperature at step 114, like the second exhaust purification catalyst, can be set based on the temperature at which the exhaust purification catalyst can react the reducing intermediates and active $NO_X$ with a predetermined efficiency. For example, it is possible to employ the temperature at which the third exhaust purification catalyst 13 can react the reducing intermediates and active $NO_X$ with a predetermined efficiency as the second judgment temperature.

When the upstream side end of the third exhaust purification catalyst 13 is less than the first judgment temperature and, furthermore, the temperature of the downstream side end of the third exhaust purification catalyst 13 is higher than the second judgment temperature, the amount of electrification is set at step 115. Further, at step 116, control may be performed to electrify the third exhaust purification catalyst 13 so as to raise the temperature of the third exhaust purification catalyst 13. In particular, control may be performed to raise the temperature of the upstream side end of the third exhaust purification catalyst 13. As a result, the third exhaust purification catalyst 13 can remove $NO_X$ efficiently.

The temperature raising device which raises the temperature of the third exhaust purification catalyst 13 in the present embodiment is formed so as to heat the third exhaust purification catalyst as a whole, but the temperature raising device is not limited to this. It is sufficient that it be formed so as to raise the temperature of the upstream side end of the third exhaust purification catalyst.

In the above control routines, the order of the steps may be suitably changed within a range not changing the functions and actions. The above embodiments may be suitably combined. In the above figures, the same or equivalent parts are assigned the same reference notations. Note that the above embodiments are illustrative and do not limit the invention. Further, the embodiments include changes which are shown in the claims.

REFERENCE SIGNS LIST

2 combustion chamber
3 fuel injector
13 exhaust purification catalyst
15 hydrocarbon feed valve
23, 24 temperature sensor
30 electronic control unit
50 catalyst carrier
51 catalyst particles
54 catalyst carrier
55, 56 catalyst particles
57 basic layer
58 exhaust flow surface part
61 upstream side catalyst
62 downstream side catalyst
63 particulate filter

The invention claimed is:

1. An exhaust purification system of an internal combustion engine, the exhaust purification system comprising:
- an engine exhaust passage;
- an exhaust purification catalyst inside of the engine exhaust passage for causing $NO_X$ and hydrocarbons that are contained in an exhaust to react,
  - wherein the exhaust purification catalyst comprises an upstream side catalyst and a downstream side catalyst, the upstream side catalyst having an oxidation ability, and the downstream side catalyst carrying precious metal catalyst particles on an exhaust flow surface and being formed with basic exhaust flow surface parts around the catalyst particles; and
- an electronic control unit, wherein the electronic control unit is configured to control a vibration of a concentration of hydrocarbons flowing into the exhaust purification catalyst within a predetermined range of amplitude and within a predetermined range of period, and is configured to control the vibration period of the hydrocarbon concentration longer than the predetermined range of period, wherein
  - when the electronic control unit controls the vibration of the concentration of hydrocarbons flowing into the exhaust purification catalyst within the predetermined range of amplitude and within the predetermined range of period, the exhaust purification catalyst has a property of chemically reducing the $NO_X$ that is contained in the exhaust by partially oxidizing the hydrocarbons, activating the $NO_X$ to generate active $NO_X$, causing the partially oxidized hydrocarbons and the active $NO_X$ to react so as to produce reducing intermediates, and causing the reducing intermediates and the active $NO_X$ react, and the exhaust purification catalyst has a property of chemically reducing the $NO_X$ that is contained in the exhaust without storing, or storing a fine amount of nitrates in the basic exhaust flow surface parts, when the electronic control unit controls the vibration period of the hydrocarbon concentration longer than the predetermined range of period, the exhaust purification catalyst has a property of being increased in a storage amount of $NO_X$ that is contained in the exhaust; and a temperature raising device that raises a temperature of the upstream side catalyst, wherein the electronic control unit is configured to set a first judgment temperature based on a temperature at which the upstream side catalyst can partially oxidize the hydrocarbons by a predetermined efficiency or based on a temperature at which the upstream side catalyst can produce reducing intermediates by a predetermined efficiency, the electronic control unit configured to set a second judgment temperature based on a temperature at which the downstream side catalyst can react the reducing intermediates and the active $NO_X$ by a predetermined efficiency, and when the temperature of the upstream side catalyst is less than the first judgment temperature and the temperature of the downstream side catalyst is higher than the second judgment temperature, the electronic control unit is configured to cause the temperature raising device to raise the temperature of the upstream side catalyst.

2. The exhaust purification system of an internal combustion engine as set forth in claim 1, wherein the upstream side catalyst is comprised of an oxidation catalyst that has an oxidizing function, and the first judgment temperature is set based on a temperature at which the upstream side catalyst can partially oxidize hydrocarbons by a predetermined efficiency.

3. The exhaust purification system of an internal combustion engine as set forth in claim 1, wherein the upstream side catalyst comprises precious metal catalyst particles that are carried on the exhaust flow surface and basic exhaust flow surface parts that are formed around the catalyst particles, and the first judgment temperature is set based on a temperature at which the upstream side catalyst can produce reducing intermediates by a predetermined efficiency.

4. The exhaust purification system of an internal combustion engine as set forth in claim 1, wherein the exhaust purification catalyst is a catalyst comprised of the upstream side catalyst and the downstream side catalyst that are integrally formed, an integrally formed catalyst has precious metal catalyst particles that are carried on the exhaust flow surface and basic exhaust flow surface parts that are formed around the catalyst particles, a temperature of the upstream end of the integrally formed catalyst is the temperature of the upstream side catalyst and a temperature of the downstream end of the integrally formed catalyst is the temperature of the downstream side catalyst.

* * * * *